US011509369B2

(12) United States Patent
Ji et al.

(10) Patent No.: US 11,509,369 B2
(45) Date of Patent: Nov. 22, 2022

(54) TRANSMISSION AND RECEPTION METHOD FOR MULTI-MODAL APPARATUS IN MILLIMETER BAND

(71) Applicant: Samsung Electronics Co., Ltd., Gyeonggi-do (KR)

(72) Inventors: Hyoungju Ji, Gyeonggi-do (KR); Younsun Kim, Gyeonggi-do (KR); Juho Lee, Gyeonggi-do (KR); Jinkyu Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/096,304

(22) Filed: Nov. 12, 2020

(65) Prior Publication Data
US 2021/0143879 A1    May 13, 2021

(30) Foreign Application Priority Data
Nov. 12, 2019   (KR) .......................... 10-2019-0144503

(51) Int. Cl.
*H04B 7/0456* (2017.01)
*H04L 1/00* (2006.01)
(Continued)

(52) U.S. Cl.
CPC ......... *H04B 7/0486* (2013.01); *H04B 7/0426* (2013.01); *H04B 17/327* (2015.01); *H04L 1/0073* (2013.01); *H04W 72/046* (2013.01)

(58) Field of Classification Search
CPC .. H04B 7/0486; H04B 7/0426; H04B 17/327; H04L 1/0073; H04W 72/046
See application file for complete search history.

(56) References Cited

U.S. PATENT DOCUMENTS

| 10,218,490 B1 * | 2/2019 | Yang ....................... G01S 7/038 |
| 10,992,355 B2 * | 4/2021 | Lee ...................... H04B 7/0456 |

(Continued)

FOREIGN PATENT DOCUMENTS

| JP | 5107804      | 12/2012 |
| KR | 1020090012711 | 2/2009  |

(Continued)

OTHER PUBLICATIONS

International Search Report dated Feb. 16, 2021 issued in counterpart application No. PCT/KR2020/015882, 7 pages.

(Continued)

*Primary Examiner* — James M Perez
(74) *Attorney, Agent, or Firm* — The Farrell Law Firm, P.C.

(57) ABSTRACT

A communication technique and a system thereof for are provided fusing a 5G communication system to support higher data rates, which is subsequent to the 4G system, with IoT technology. The disclosure may be applied to intelligent services (e.g., smart homes, smart buildings, smart cities, smart cars or connected cars, healthcare, digital education, retail business, security and safe-related services, etc.) based on 5G communication technology and IoT-related technology. A method of operating a base station in a wireless communication system includes transmitting channel feedback configuration information to a terminal; receiving channel feedback information from the terminal; and performing transmission/reception of data, based on the channel feedback information. The channel feedback information may include information indicating a state of an antenna panel of the terminal.

24 Claims, 15 Drawing Sheets

(51) Int. Cl.
*H04W 72/04* (2009.01)
*H04B 17/327* (2015.01)
*H04B 7/0426* (2017.01)

(56) References Cited

U.S. PATENT DOCUMENTS

| | | | | |
|---|---|---|---|---|
| 11,356,166 | B2* | 6/2022 | Bai | H04B 7/088 |
| 11,394,435 | B2* | 7/2022 | Lee | H04B 7/0482 |
| 2009/0036183 | A1* | 2/2009 | Cho | H01Q 1/242 |
| | | | | 455/575.7 |
| 2013/0010744 | A1* | 1/2013 | Kang | H04B 7/0645 |
| | | | | 370/329 |
| 2013/0217450 | A1* | 8/2013 | Kanj | H01Q 21/293 |
| | | | | 455/575.7 |
| 2015/0050927 | A1* | 2/2015 | Moisio | H04B 7/0413 |
| | | | | 455/422.1 |
| 2017/0351827 | A1* | 12/2017 | Rogers | G01S 7/415 |
| 2018/0054744 | A1* | 2/2018 | Smith | H04B 7/0695 |
| 2018/0091272 | A1* | 3/2018 | Wang | H04B 7/0626 |
| 2018/0123664 | A1* | 5/2018 | Li | H04B 7/0413 |
| 2018/0192384 | A1* | 7/2018 | Chou | H04W 24/10 |
| 2018/0206132 | A1* | 7/2018 | Guo | H04B 7/0404 |
| 2018/0212694 | A1* | 7/2018 | Jheng | H04L 1/1861 |
| 2018/0219606 | A1* | 8/2018 | Ng | H04L 5/0048 |
| 2018/0227094 | A1* | 8/2018 | Liu | H04W 72/046 |
| 2018/0324716 | A1* | 11/2018 | Jeon | H04W 74/0833 |
| 2019/0007117 | A1* | 1/2019 | Kim | H04B 7/0617 |
| 2019/0104507 | A1* | 4/2019 | Majmundar | H04W 36/06 |
| 2019/0363843 | A1* | 11/2019 | Gordaychik | H04W 52/58 |
| 2019/0385375 | A1* | 12/2019 | Park | G06F 1/1698 |
| 2020/0029274 | A1* | 1/2020 | Cheng | H04B 17/309 |
| 2020/0059867 | A1* | 2/2020 | Haghighat | H04W 52/262 |
| 2020/0137657 | A1* | 4/2020 | Chavva | H04W 76/19 |
| 2020/0204240 | A1* | 6/2020 | Ryu | H04B 7/0691 |
| 2020/0280360 | A1* | 9/2020 | Bai | H04B 7/088 |
| 2020/0314764 | A1* | 10/2020 | Noh | H04B 7/0695 |
| 2020/0328785 | A1* | 10/2020 | Lee | H04B 7/0695 |
| 2020/0344686 | A1* | 10/2020 | Venugopal | H04W 52/0235 |
| 2020/0344694 | A1* | 10/2020 | Jangid | H04W 64/003 |
| 2020/0366431 | A1* | 11/2020 | Zhou | H04B 7/0691 |
| 2021/0143879 | A1* | 5/2021 | Ji | H04L 1/0023 |
| 2021/0226677 | A1* | 7/2021 | Lee | H04B 7/0404 |
| 2021/0274382 | A1* | 9/2021 | Bai | H04W 28/06 |

FOREIGN PATENT DOCUMENTS

| | | |
|---|---|---|
| KR | 1020110107723 | 10/2011 |
| WO | WO 2018-232294 | 12/2018 |

OTHER PUBLICATIONS

European Search Report dated Sep. 26, 2022 issued in counterpart application No. 20886936.2-1206, 12 pages.

* cited by examiner

A (200)

B (210)

TRANSMISSION AND RECEPTION METHOD FOR MULTI-MODAL APPARATUS IN MILLIMETER BAND

CROSS-REFERENCE TO RELATED APPLICATION(S)

This application is based on and claims priority under 35 U.S.C. § 119 to Korean Patent Application No. 10-2019-0144503, filed on Nov. 12, 2019, in the Korean Intellectual Property Office, the entire disclosure of which is incorporated herein by reference.

BACKGROUND

1. Field

The disclosure relates generally to a communication system and a terminal function for obtaining a variety of information through one or more functions using one electromagnetic-wave-transmitting/receiving device and obtaining information for scheduling data of a terminal using the same.

2. Description of Related Art

To meet the increasing demand for wireless data traffic, efforts have been made to develop an improved 5$^{th}$ generation (5G) communication system or a pre-5G communication system. The 5G communication system or the pre-5G communication system may also be referred to as a beyond 4$^{th}$ generation (4G) network communication system or a post long term evolution (LTE) system, in order to achieve a high data transmission rate, implementation of the 5G communication system in an ultrahigh-frequency (mmWave) band (e.g., a 60 GHz band) is being considered.

In the 5G communication system, technologies such as beamforming, massive multiple-input and multiple-output (MIMO), full dimensional MIMO (FD-MIMO), array antennas, analog beam-forming, and large scale antennas are, being discussed to mitigate propagation path loss in the mm Wave band and increase propagation transmission distance.

Further, the 5G communication system has developed technologies such as evolved small cells, advanced small cells, cloud Radio Access Networks (RANs), ultra-dense networks, device to device communication (D2D), wireless backhaul, moving networks, cooperative communication, coordinated multi-points (CoMP), and received interference cancellation to improve the system network. In addition, the 5G system has developed advanced coding modulation (ACM) schemes such as hybrid frequency shift keying (FSK) and quadrature amplitude modulation (QAM) (FQAM) and sliding window superposition coding (SWSC), and advanced access technologies such as filter bank multi carrier (FBMC), non-orthogonal multiple access (NOMA), and sparse code multiple access (SCMA).

Meanwhile, the Internet has been evolved to an Internet of things (IoT) network in which distributed components, i.e., things, exchange and process information from a human-oriented connection network in which humans generate and consume information. The Internet of everything (IoE), which is a combination of IoT technology and big-data processing technology through connection with a cloud server, has also emerged. In order to implement IoT, technical factors such as sensing techniques, wired/wireless communication, network infrastructure, service-interface technology, and security technology are required, and research on technologies such as sensor networks, machine-to-machine (M2M) communication, machine-type communication (MTC), etc., for connection between objects has recently been conducted. An IoT environment may provide intelligent Internet technology services by collecting and analyzing data produced from connected things. The IoT may be applied to fields, such as smart homes, smart buildings, smart cities, smart cars, connected cars, smart grids, health care, smart home appliances, or high-tech medical services, through the convergence of the conventional information technology and various industries.

Various attempts have been made to apply 5G communication systems to IoT networks. For example, technologies such as sensor networks, M2M communication, MTC, and etc., are being implemented using 5G communication techniques, such as beamforming, MIMO, array antennas, etc. The application of a cloud RAN as the above-described big-data processing technology may also be considered for convergence between the 5G technology and the IoT technology.

In addition, if a device performs measurement of a signal in a mmWave band, additional information other than the wireless channel state may be obtained.

SUMMARY

An aspect of the disclosure is to provide a method in which a device transmits and receives data to and from a terminal using directly obtained information, as well as feedback about a channel state of a counterpart device, and an apparatus thereof.

In accordance with an aspect of the disclosure, a method is provided for operating a base station in a wireless communication system. The method includes transmitting channel feedback configuration information to a terminal; receiving channel feedback information from the terminal; and performing transmission/reception of data, based on the channel feedback information. The channel feedback information may include information indicating the state of an antenna panel of the terminal.

In accordance with another aspect of the disclosure, a method is provided for operating a terminal in a wireless communication system. The method includes receiving channel feedback configuration information from a base station; producing channel feedback information, based on the channel feedback configuration information; and transmitting the channel feedback information to the base station. The channel feedback information includes information indicating the state of an antenna panel of the terminal.

In accordance with another aspect of the disclosure, a base station is provided for use in a wireless communication system. The base station includes a transceiver; and a controller connected to the transceiver and configured to transmit channel feedback configuration information to a terminal, receive channel feedback information from the terminal, and perform control to transmit and receive data, based on the channel feedback information. The channel feedback information includes information indicating the state of an antenna panel of the terminal.

In accordance with another aspect of the disclosure, a terminal is provided for use in a wireless communication system. The terminal includes a transceiver; and a controller connected to the transceiver and configured to receive channel feedback configuration information from a base station, produce channel feedback information, based on the channel feedback configuration information, and perform control to transmit the channel feedback information to the base station. The channel feedback information includes information indicating the state of an antenna panel of the terminal.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
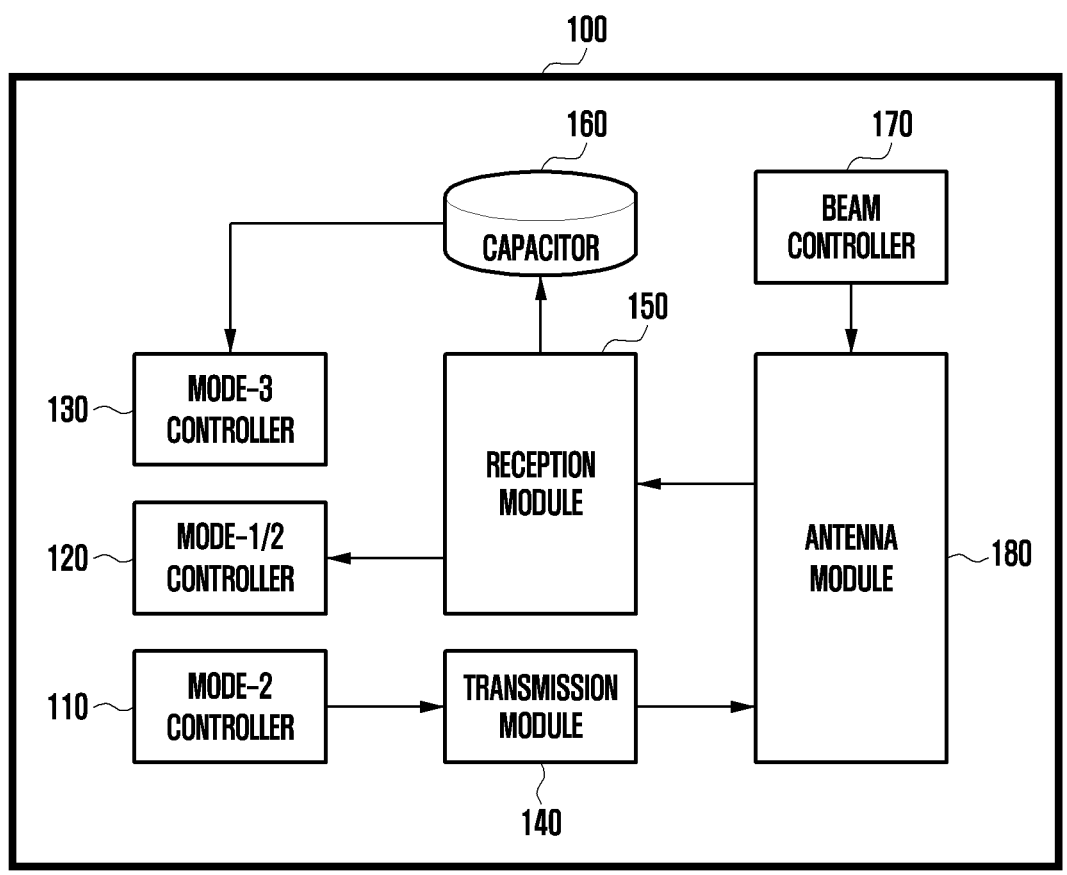
FIG. 1 illustrates a base station apparatus supporting three sensing modes according to an embodiment.

Hereinafter, embodiments of the disclosure will be described in detail with reference to the accompanying drawings.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For similar reasoning, some components are exaggeratedly or schematically illustrated in the accompanying drawings, or are omitted therefrom. In addition, the size of each component may not fully reflect the actual size thereof.

The advantages and features of the disclosure and methods of achieving the same will be apparent by referring to embodiments of the disclosure as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block(s). These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, a "unit does not always have a meaning limited to software or hardware. A "unit" or "module" may be constructed either to be stored in an addressable storage medium or to execute one or more processors. Therefore, "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" may be either combined into a smaller number of elements or "units" or divided into a larger number of elements and "units". Elements, "units" and/or "modules" may be implemented to reproduce one or more central processing units (CPUs) within a device or a security multimedia card. Further, the term "unit" may include one or more processors.

Hereinafter, terms for identifying connection nodes, terms referring to network entities, terms referring to messages, terms referring to interfaces between network entities, terms referring to a variety of identification information, etc., will be used as examples for the convenience of explanation. Therefore, the disclosure is not limited to the terms used herein, and other terms referring to objects having equivalent technical meanings may be used.

For the convenience of explanation, in the disclosure, terms and names defined in the standard for a 5G, new radio (NR), or LTE system will be used. However, the disclosure is not limited to the above-mentioned terms and names, and the disclosure may be equally applied to systems conforming to other standards. That is, although embodiments of the disclosure will be described in detail, based on the communication standard defined in $3^{rd}$ generation partnership project (3GPP), the subject matter of the disclosure can be applied to other communication systems having similar technical background through slight modification without departing from the scope thereof, which will be possible according to the judgment of those skilled in the art of the disclosure.

A wireless communication system is advancing to a broadband wireless communication system for providing high-speed and high-quality packet data services using communication standards such as high-speed packet access (HSPA) of 3GPP, LTE, or evolved universal terrestrial radio access (E-UTRA), LTE-advanced (LTE-A), LTE-Pro, high-rate packet data (HRPD) of 3GPP2, ultra-mobile broadband (UMB), IEEE 802.16e, etc., as well as typical voice-based services.

As an example of a broadband wireless communication system, LTE and NR systems employ an orthogonal frequency division multiplexing (OFDM) scheme or a cyclic prefix-based orthogonal frequency division multiplex (CP-OFDM) scheme in a downlink (DL) and employ a single carrier frequency division multiple access (SC-FDMA) scheme or a discrete Fourier transform spread OFDM (DFT-s-OFDM) scheme or a CP-OFDM scheme in an uplink (UL). The UL denotes a radio link through which a terminal, e.g., a user equipment (UE) or a mobile station (MS), transmits data or control signals to a base station, e.g., a generation Node B (gNB) or an eNode B (eNB which is a node that is capable of allocating radio resources to a plurality of terminals, and the wireless access technology supported by the base station is not limited, and DL denotes a radio link through which the base station transmits data or control signals to the terminal. The multiple-access scheme separates data or control information for each user by allocating and operating time-frequency resources to transmit the data or control information for each user in order to avoid overlapping of the same (i.e., to establish orthogonality).

Because a 5G communication system should reflect various requirements of users, service providers, etc., services satisfying various requirements must be supported. The services considered for the 5G communication system include enhanced mobile broadband (eMBB) communication, massive MTC (mMTC), ultra-reliability low-latency communication (URLLC), etc.

The disclosure provides a method in which a base station schedules a terminal and provides services using feedback information directly obtained by the base station together with channel state feedback of a terminal, and an apparatus thereof. Accordingly, the number of channel state feedback resources of a terminal may be reduced. In addition, the signal transmission power of a base station may be reduced through appropriate scheduling, and the base station may provide the same function without a plurality of sensors. Further, the base station may provide services by obtaining information for self-determination.

Channel state feedback of a terminal and scheduling of a base station in consideration of the channel state feedback of the terminal are performed between the base station and the terminal in a conventional communication system. Accordingly, it is possible to transmit and receive data through an adaptive radio link. In addition, the terminal and the base station may obtain additional information using an application through one or more sensors or additional devices, which are provided in the terminal or the base station, but the obtained information is not used for adaptation of the radio link.

A base station transmits a reference signal (RS) to a terminal in predetermined or preconfigured time and frequency resources, and the RS has a predetermined signature. The terminal estimates a channel and/or a channel state, based on the received RS, and quantizes the channel capacity that can be obtained based on the estimated channel and/or the channel state, such as interference, noise, etc., thereby transmitting the same to the base station. This process may be referred to as "channel training" or a "channel feedback loop".

The feedback of a channel may include implicit feedback indirectly expressing a channel matrix "H" and/or explicit feedback transmitting important information among the information of the channel matrix "H". The implicit feedback, which is the most commonly used feedback among the types of feedback described above, may include some of the following components. Hereinafter, the terminology "channel feedback" may be used interchangeably with "channel state information (CSI)". The components are as follows.

RI: rank indicator
PMI: precoder matrix indicator
CQI: channel quality indicator
LI: layer indicator An RI denotes the rank of the channel, and the rank indicates the number of layers or the number of independent information streams that can be transmitted between a base station and a terminal. The rank mathematically represents the number of dominant eigenvectors in the channel matrix and physically represents the number of separable multi-paths. Accordingly, if the rank is 1, there is one separable path in the channel matrix, and if the rank is 2, there are two separable paths in the channel matrix. Therefore, the amount of data transfer when the rank is 2 may theoretically be double the amount of data transferred when the rank is 1 using two independent and orthogonal paths.

PMI refers to a spatial feature of the separable orthogonal or non-orthogonal channel. The spatial feature may indicate the directivity of a radio wave between a transmitter and a receiver, and may represent a direct path, an indirect path, or a reflected path. The spatial feature may be pre-quantized using a rule predetermined between a transmitter and a receiver, and a receiver (e.g., a terminal) feeds back an index of a component that provides the most optimal channel capacity, among the quantized components, to a transmitter (e.g., a base station) using the PMI. A set of components indicating the quantized spatial feature may be referred to as a "codebook". In the case of the PMI, the quantization method is related to the RI. For example, the receiver may feedback an index of the spatial feature representing one angle if the RI is 1, and may feedback an index of the spatial feature representing two angles if the RI is 2. The PMI may include a first PMI i1 and a second PMT i2. The first PMI may indicate the directivity to be applied to a long term and/or a wideband, and the second PMI may indicate the directivity to be applied to a short term and/or a sub-band.

The CQI is obtained by quantizing the channel capacity that can be obtained when a base station transmits data to a terminal using the RI and the PMI determined by the terminal.

LI is an indicator that indicates the layer having the highest channel capacity among the layers. The LI may be used to transmit information, which is to be a reference, between a transmitter and a receiver, and a signal for tracking a phase change, e.g., a phase tracking RS (PT-RS), may be included in the layer having the highest channel capacity.

In addition, a CSI-RS resource indicator (CRI) may be provided to indicate a CSI-RS resource selected by the terminal. When the terminal feeds back the CRI, another component may understand that the CRI is channel information on the indicated CSI-RS resource.

Therefore, the channel information obtained by the transmitter through the receiver indicates the number of paths into which the channel is divided, spatial features of the respective paths, and the amount of data transmitted to the receiver when transmitting data to the receiver using the separated paths.

In order to obtain such channel characteristics, the transmitter may transmit a CSI-RS, and the CSI-RS may be used for various purposes.

1. Measurement of channel and feedback
2. Measurement of RS strength and feedback
3. Selection of best beam
4. Support for mobility
5. Tracking of time-frequency offset The measurement of a channel includes the receiver quantizing the aforementioned channel and feeding the same back to the transmitter. The measurement of RS strength denotes that the receiver quantizes RS reception power and feeds the same back to the transmitter, and the RS strength is RS received power (RSRP). The selection of the best beam includes the receiver selecting the best beam when respective CSI-RSs are transmitted based on different weights using beams having different shapes. In addition, the beam selected by the receiver may be fed back to the transmitter.

The support for mobility denotes that the amount of change in the strength of a CSI-RS used by one or more base stations is measured and the CSI-RS is used to determine whether or not a terminal moves from one base station to another base station, and information on the CSI-RS strength measured by the terminal may be fed back to the base station. The tracking of time-frequency offset denotes that a time-frequency error is eliminated for time-frequency synchronization between the modem used by the base station and the modem used by the terminal, based on the CSI-RS, and the CSI-RS is consistently used for tracking for such an operation.

The base station may inform the terminal separately of the CSI-RSs for respective functions, or the same CSI-RS may be used for a plurality of purposes described above. However, the respective functions, except for the time-frequency offset tracking, may be based on feedback of the terminal.

For channel feedback, the component to be fed back may be configured, and the terminal feeds back the channel to the base station using the following formats (e.g., a set of components).

1: cri-RI-PMI-CQI
2: cri-RI-LI-PMI-CQI
3: cri-RI-i1
4: cri-RI-i1-CQI
5: cri-RI-CQI
6: cri-RSRP
7: none The cri-RI-PMI-CQI is feedback for closed-loop transmission, and wideband and sub-band PMIs (e.g., a first PMI and a second PMI) and a CQI are included therein. The wideband PMI may have a small number of bits in quantization, and the sub-band PMI is intended to indicate a more precise angle (or direction) through additional quantization, based on the direction selected in the wideband PMI. The Cri-RI-LI-PMI-CQI is a format obtained by adding LI to the above-described format, which allows additional phase tracking.

The Cri-RI-i1 is a format indicating the CSI-RS indicated by the CRI and the angle (or directivity) at which the CSI-RS is transmitted.

The is a format indicating the best wideband PMI for the base station to transmit data, and in this case, a CQI is fed back on the assumption that the sub-band PMT corresponding to the selected wideband PMI is randomly or cyclically used without selection and feedback by the terminal. Therefore, the Cri-RI-i1-CQI may be used for semi-open loop transmission.

For the Cri-RI-CQI, the terminal does not feedback the PMI because the base station transmits the CSI-RS at a predetermined angle in advance.

The CRI-RSRP is a format to feed back the magnitude of the reception power of the CSI-RS. An indication of "None" means that the terminal feeds back nothing. This is intended to use the CSI-RS for tracking or to allow the terminal to identify the magnitude of a reception signal, based on various assumptions, as described above. For example, when the terminal uses one or more reception beams, "None" may be configured, and the terminal may measure the magnitude of the reception signal according to various reception beams.

Hereinafter, information, which can be further obtained when an apparatus performs measurement of a signal in a millimeter wave (mmWave) band (e.g., 60 GHz to 100 GHz), will be described. When performing transmission and measurement of signals in the millimeter wave band, micro-Doppler, reflectivity, transmittance, radiometric temperature, etc., may be measured. The micro-Doppler utilizes the Doppler effect in which the frequency of a transmission signal is modulated due to the speed of an object to be measured relative to a measurement device so that the signal is reflected, and if changes in the speed in the respective portions of the measurement object are represented as a time-frequency image using the reflection signal, the shape of a Doppler shift that appears regularly over time may be obtained. In particular, because the resolution of the micro-Doppler increases as the frequency of the signal becomes higher in the millimeter wave band, it is possible to recognize the detailed motion of the object to be measured by analyzing the micro-Doppler.

When a material exists in the path of the transmission signal, the transmission signal may be reflected, absorbed, or transmitted according to reflectivity, absorptivity, and transmissivity, which differs depending on the type of material. In addition, the respective materials may have different radiometric temperatures according to the type of material. This may be determined by the emissivity of each material, and the type of material may be identified through measurement thereof. As described above, it is possible to ident the type of material by measuring reflectivity absorptivity, transmissivity, and/or emissivity.

Hereinafter, a method in which a multi-modal apparatus obtains information, other than the channel information described above, and an apparatus thereof, will be described.

According to an embodiment, a transmitter may use three sensing methods.

Method 1: Transmissive Sensing (hereinafter, referred to as "mode 1"): Transmissive sensing is a sensing method in which a transmitter paired with a receiver transmits a signal to the receiver and the receiver receives the transmitted signal, thereby directly obtaining channel information between the transmitter and the receiver. Because the receiver receiving the signal transmitted from the transmitter is aware of the signature of the signal, the channel "h" may be estimated. If there are one or more antennas, the receiver may measure spatial information (a reception angle) of the signal using the phase difference between signals arriving at the respective antennas. In addition, the receiver may be able to recognize the type of material existing in the path of the signal by estimating transmissivity, absorptivity, and/or reflectivity through the transmissive sensing.

Because a terminal transmits a sounding RS (SRS) to a base station in an LTE or NR communication system, the base station may obtain channel information through the SRS. The SRS may be transmitted in a licensed band or an unlicensed band when the base station configures transmission to the terminal, and the SRS may be transmitted in an exclusive radar band (e.g., 76 to 80, 86 to 90, or 94 to 94.1 GHz) adjacent to the licensed band or the unlicensed band. The base station may transmit configuration information for the terminal to transmit the SRS in the exclusive radar band, and the configuration information may include at least one of an SRS transmission period, a frequency resource through which the SRS is transmitted, and SRS sequence configuration information. In addition, the base station may configure some symbols in some licensed bands or unlicensed bands as blank symbols (i.e., a symbol that transmits no signal) with respect to the terminal, and may perform measurement in the blank symbols. Alternatively, the base station may make a configuration such that the SRS is transmitted in the configured symbols by utilizing the licensed, the unlicensed band, and/or the exclusive radar band. The terminal may transmit an SRS that is not duplicated with other signals. In addition to the SRS, a signal such as a UL demodulation RS may be used in sensing mode 1.

Method 2: Active Sensing (hereinafter, referred to as "mode 2"): Active sensing is a sensing method in which a transmitter transmits a specific signal and obtains information, based on a reflected signal, and since the transmitter is aware of the signal transmitted by itself, a reflected channel "h²" may be estimated. In addition, if the terminal performs feedback on the magnitude of a reception signal, the base station may estimate a reflection coefficient of sensing information, and based on this, the channel may be estimated without additional feedback from the terminal.

When the power of one OFDM symbol in the transmitter is $P_{tx}$, when a total of $N_{fft}$ FFTs and IFFTs are performed, the power per sample corresponds to $$P_{tx,s} = \frac{P_{tx}}{N_{fft}}.$$

It is assumed that a transmission signal having a simple length of $N_{fft}+N_{cp}$ is $s_{tx}(n) \in \mathbb{C}^{(N_{fft}+N_{cp}) \times 1}$ and that the reception signal of the transmission signal is $s_{rx}(n)$. In this case, $s_{rx}(n)$ may be expressed as shown in Equation (1) below. In Equation (1) below, h(n) corresponds to a channel.

$$s_{rx}(n) = s_{tx}(n) \otimes h(n) \qquad (1)$$

Equation (1) may be expressed as Equation (2) below. In Equation (2), $h_i$ is a channel coefficient of the reflection wave, and a is a reflection coefficient.

$$s_{rx}(n) = s_{tx}(n) + h_1 s_{tx}(n-\delta) + h_2 s_{tx}(n-2\delta) + \ldots + h_{N_{cp}} s_{tx}(n-N_{cp}\delta) \qquad (2)$$

Equation (3) below expresses when a reception signal corresponding to a direct path is removed from Equation (2). Since the terminal is aware of the transmission signal, such removal is possible.

$$\bar{s}_{rx}(n) = \alpha(h_1^2 s_{tx}(n-\delta) + h_2^2 s_{tx}(n-2\delta) + \ldots + h_{N_{cp}}^2 s_{tx}(n-N_{cp}\delta)) \qquad (3)$$

Equation (4) below may be obtained in consideration of the reception signal and the transmission signal according to reflection in Equation (3) in a unit of tap. Here, $h_i^2$ is the result of experiencing the same channel twice by the channel that the $i^{th}$ reflection wave experiences before reflection and the channel that the it reflection wave experiences after reflection. For example, if a path corresponding to 2δ is estimated, Equation (4) is obtained below.

$$\hat{s}_{rx}(n) = \bar{s}_{rx}(n) \otimes s_{tx}(n) = \alpha(h_1^2 s_{tx}(n-\delta) + h_2^2 s_{tx}(n-2\delta) + \ldots + h_{N_{cp}}^2 s_{tx}(n-N_{cp}\delta)) \otimes s_{tx}(n-2\delta) \qquad (4)$$

Equation (4) may be expressed as Equation (5). Here, $\sigma^2$ is Gaussian noise power.

$$\hat{s}_{rx}(n) = \alpha(h_2^2 + \sigma^2) \qquad (5)$$

Equation (5) may be expressed as Equation (6) below.

$$\hat{s}_{rx}(n) = \alpha h_2^2 + \alpha \sigma^2 \qquad (6)$$

If it is assumed that there is an error ($\Delta h_2$) between the channel ($\hat{h}_2$) estimated by the terminal and the actual channel ($h_2$), the channel may be expressed as shown in Equation (7) below.

$$\hat{h}_2 = h_2 + \Delta h_2 \qquad (7)$$

Equation (7) may be expressed as shown in Equation (8) below.

$$\hat{h}^2_2 = (h_2 + \Delta h_2)^2 = h_2^2 + 2h_2 \Delta h_2 + \Delta h_2^2 \qquad (8)$$

When the terminal converts the information ($\hat{h}^2_2$) into CQI or RSRP and feeds it back to the base station, the base station may derive the relationship shown in Equation (9) below.

$$\frac{\hat{s}_{rx}(n)}{\hat{h}^2_2} = \frac{\alpha(h_2^2 + \sigma^2)}{h_2^2 + 2h_2 \Delta h_2 + \Delta h_2^2} \qquad (9)$$

$$\frac{\hat{s}_{rx}(n)}{\hat{h}^2_2} = \frac{\alpha\left(1 + \frac{\sigma^2}{h_2^2}\right)}{1 + \frac{2\Delta h_2}{h_2} + \frac{\Delta h_2^2}{h_2^2}} \approx \frac{\alpha}{1 + \frac{2\Delta h_2}{h_2}}$$

When the base station converts the received information using the RSRP measured by the terminal, e.g., when the error is at a maximum level of 20%, the error of the reflection coefficient is expressed as Equation (10) below.

$$\frac{\hat{S}_{rx}(n)}{\hat{h}^2_2} = \frac{\alpha}{1 \pm 0.2} = (1 \pm 0.167)\alpha \quad (10)$$

In this case, using Equation (11), the base station may derive the reflection coefficient α by averaging one or more pieces of measurement information, based on Equation (10).

$$E\left[\frac{\hat{S}_{rx}(n)}{\hat{h}^2_2}\right] \simeq \alpha \quad (11)$$

When the reflection coefficient is derived, the base station may then derive $h_2^2$ using only a reception signal $\hat{s}_{rx}(n)$ through reflection, as derived in Equation (12) below.

$$E\left[\frac{\hat{S}_{rx}(n)}{\alpha}\right] \simeq \hat{h}^2_2 \quad (12)$$

Therefore, the base station may predict the channel capacity C between the terminal and the base station using the function shown in Equation (13) below.

$$C = BW \log\left(1 + \frac{\|h_2\|^2_2}{\sigma^2}\right) \quad (13)$$

That is, the base station may perform data scheduling according to the prediction of the channel capacity without feedback of the terminal in addition, the terminal is able to perform an operation of identifying the state of the antenna panel (e.g., the state in which it is difficult to transmit and receive signals due to a user's body or an object) through the active sensing.

Method 3: Passive Sensing (hereinafter, referred to as "mode 3"): Passive sensing is a method in which a transmitter detects a signal even if there is no signal. To this end, the space to be measured must be separated in advance, which may be performed using a beamforming technique. For example, the base station performs reception in a specific space using a beamforming weight (or a reception beam, and may be applied to the reception of a signal in a specific direction) indicated by b1 at time t1. However, because there is no signal, the signal received using b1 at time t1 corresponds to a noise signal ($n_{(t_1,b_1)}$). The source of the received noise signal is as follows.

$n_{(t_1,b_1)}$=device noise (n1) (i.e., noise produced in a receiving device), white noise (n2) in the atmosphere, and noise (n3) generated due to vibration of electrons of an object present in the corresponding space.

Here, the base station accumulates the noise $n_{(t_1,b_1)}$ for a predetermined time as shown in Equation (14).

$$\bar{n}_{(b_1)} = \int_{t_a}^{t_b} n_{(t_1,b_1)} dt_1 \quad (14)$$

When the accumulation is performed for all beams (these may be distinguished from each other by different beamforming weights), each cumulative value may be expressed as shown in Equation (15).

$$\bar{n}_{(b_1)} = n_1 + n_2 + n_3(b_1) \text{ for all beams} \quad (15)$$

That is, $n_1$ and $n_2$ are independent of the beam, and only $n_3$ may vary depending on the beam. Therefore, as the cumulative time becomes longer, the error $\Delta n_3(b)$ between values $\bar{n}_{(b)}$ becomes large.

If there are devices including power, metal objects, or living things in the coverage of the base station, as the cumulative time becomes longer, $\Delta n_3(b)$ becomes much larger. Thus, the base station may determine whether or not there is a device in the direction (or at an angle) corresponding to the beam. If the base station further performs the sensing in mode 1, it is possible to check whether or not there is a terminal, and afterwards, tracking can be continued without signal transmission by the terminal.

FIG. 1 illustrates a base station apparatus that supports three sensing modes according to an embodiment.

Referring to FIG. 1, a base station 100 includes a mode-2 controller 110 for controlling sensing in mode 2, a mode-1/2 controller 120 for controlling sensing in modes 1 and 2, a mode-3 controller 130 for controlling sensing in mode 3, a transmitter (or transmission module) 140 connected to the mode-2 controller 110 and controlling signal transmission for sensing in mode 2, a receiver (or reception module) 150 connected to the mode-1/2 controller 120 and the mode-3 controller 130 and controlling signal reception for sensing in modes 1, 2, and 3, a capacitor 160 for collecting information such as noise received for sensing in mode 3, the amount of noise power, etc., a beam controller 170 for controlling transmission and reception beams, and an antenna (or antenna module) 180 for generating and transmitting signals and receiving signals. The base station 100 may implement functions for controlling the respective sensing modes as separate devices, or may operate a single device to perform three sensing modes through software.

Herein, beams may be classified into several levels, and a method for classifying beams into a total of three levels is disclosed. An example of the three levels is shown in Table 1 below wherein each level is a set of beams, instead of a size or a shape of the beam.

TABLE 1

|  | Level 1 | Level 2 | Level 3 |
|---|---|---|---|
| Beam set | beam subset | beam group | beams |

Table 1 above describes respective levels of a beam set, and a method of indicating this is as follows.

Beam subset indication→CRI. This may indicate a CSI-RS resource index, and a beam subset may be understood as a set of CSI-RS resources.

Beam group indication→CSI-RS group index within CRI (CGI). This may indicate a group index of a CSI-RS group belonging to CSI-RS resources, and a beam group may be understood as a set of CSI-RS groups.

Beam indication→CSI-RS antenna port index within CGI or CRI (CPI). This may indicate an index of a CSI-RS antenna port belonging to CSI-RS resources or a CSI RS group, and a beam may be understood as a CST-RS antenna port.

At least one of the CRI, CGI, and CPI may be transmitted from the terminal to the base station together with the channel feedback information described above, and in this case, the channel feedback information described above may be understood to be information indicating a channel when a beam corresponding to the CSI-RS port, the CSI-RS group, or the CST-RS resource indicated by the CRT, CGI, and CPI is applied.

The base station may configure one or more beams as one beam group, thereby giving an indication thereof to the terminal using upper signaling, and the base station may configure one or more beam groups as one beam subset, thereby giving an indication thereof to the terminal using upper signaling. The base station may also configure one or more beam subsets to indicate all of the beams.

The base station may configure one or more beams as one beam subset, thereby giving an indication thereof to the terminal using upper signaling, and the base station may configure one or more beam subsets to indicate all of the beams. The size of the beam set may be equal to the size of the beam subset.

In addition, the base station may configure one or more beam groups as one beam subset, thereby giving an indication thereof to the terminal using upper signaling, and the size of the beam group may be 1.

When the beam levels are applied, specific channel feedback may be performed as follows.

A first channel feedback method is to feedback an index of a beam and an RSRP value, Cri-cpi-RSRP: The terminal may indicate an index of a beam subset including the best beam or the beam to be reported (hereinafter, a CSI-RS resource index) and an antenna port index in the corresponding beam subset, and may feedback reception power (e.g., RSRP) corresponding to the antenna port. When the number of configured CSI-RS resources is "N" the number of antenna ports of the CSI-RS resource is "P", and the resolution of the RSRP is K bits, feedback information is configured as the size and sequence of $\lceil \log_2 N \rceil + \lceil \log_2 P \rceil + K$. The RSRP is obtained by quantizing an average value of power received in time and frequency resources corresponding to the antenna port indicated by the antenna port index by K bits, and the base station may inform the terminal of the transmission power of the CSI-RS in advance.

Cri-RSRP: The terminal may feedback a best beam subset index and an average RSRP in the corresponding beam subset. When the number of configured CSI-RS resources is "N" and the resolution of the RSRP is K bits, feedback information is configured as the size and sequence of $\lceil \log_2 N \rceil + K$. The RSRP is obtained by quantizing an average value of power received in time and frequency resources corresponding to the antenna port included in the indicated CSI-RS resource by K bits, and the base station may inform the terminal of the transmission power of the CSI-RS in advance.

Cri-cgi-cpi-RSRP: The terminal may indicate an index of a beam subset including a beam to be reported, a beam group index (e.g., a CSI-RS group index) corresponding to the beam subset, and an antenna port index in the corresponding beam group, and may feedback RSRP corresponding to the antenna port. When the number of configured CSI-RS resources is "N", each CSI-RS resource includes G groups, the number of antenna ports of the CSI-RS in each group is "P", and the resolution of the RSRP is K bits, feedback information is configured as the size and sequence of $\lceil \log_2 N \rceil + \lceil \log_2 G \rceil + \lceil \log_2 P \rceil + K$. The RSRP is obtained by quantizing an average value of power received in time and frequency resources corresponding to the antenna port indicated by the antenna port index by K bits, and the base station may inform the terminal of the transmission power of the CSI-RS in advance.

Cri-cgi-RSRP: The terminal may indicate an index of a beam subset including a best beam group or the beam to be reported and a beam group index in the corresponding beam subset, and may feedback RSRP received in the corresponding antenna port. When the number of configured CSI-RS resources is "N", the number of CSI-RS groups is "G", and the resolution of the RSRP is K bits, feedback information is configured as the size and sequence of $\lceil \log_2 N \rceil + \lceil \log_2 G \rceil + K$. The RSRP is obtained by quantizing an average value of power received in time and frequency resources corresponding to the antenna port indicated by the antenna port index by K bits, and the base station may inform the terminal of the transmission power of the CSI-RS in advance.

Cri-cgi-Ri-RSRP: The terminal may indicate an index of a beam subset including a best beam group or the beam to be reported and a beam group index in the corresponding beam subset, may indicate a rank that maximizes the channel capacity on the assumption of a channel, the maximum rank of which is "P" when the number of antenna ports in each beam group is "P", and may feedback RSRP corresponding to the group. When the number of configured CSI-RS resources is N', the number of CSI-RS groups is "G", the number of antenna ports included in the group is "N/G" (i.e., the maximum rank is N/G), and the resolution of the RSRP is K bits, feedback information is configured as the size and sequence of $\lceil \log_2 N \rceil + \lceil \log_2 G \rceil + \lceil \log_2 N/G \rceil + K$. The RSRP is obtained by quantizing an average value of power received in time and frequency resources corresponding to the beam group indicated by the antenna port index by K bits, and the base station may inform the terminal of the transmission power of the CSI-RS in advance.

A second channel feedback method is to feedback an index of a beam and a CQI. The RSRP may be obtained using Equation (16) below.

$$RSRP = P_{TX} - PL = P_{RX} \quad (16)$$

In Equation (16), PL denotes pathless. The RSRP may be replaced with CQI, and the difference thereof is shown in Equation (17).

$$CQI = f(RSRP/NP) \quad (17)$$

In Equation (17), NP is noise power. The base station is able to accurately recognize the value of NP in the CQI, which is superior to the RSRP. The base station is able to predict the noise power in an existing 4G terminal. However, when using a millimeter wave in the 5G system, the degree of noise power significantly varies according to the implementation of the terminal or the bandwidth used by the terminal. When the terminal feeds back the CQI, the base station may make a transmission of a data channel without predicting the noise power. Therefore, the terminal may perform channel feedback by replacing the RSRP with the CQI in the above-described feedback method.

In this case, the terminal may perform feedback of Cri-cpi-CQI, Cri-CQI, Cri-cgi-cpi-CQI, Cri-cgi-CQI, or Cri-cgi-Ri-CQI.

A third feedback method is to feedback only a beam index. As described above, when the base station estimates channel information or a reflection coefficient in sensing mode 2, feedback on the RSRP of the terminal is not required thereafter. Thus, when a fixed terminal in which a beam does not change, scheduling of the base station may be possible without any feedback. If the base station requires continuous tracking of the terminal in consideration of the mobility of the terminal, the base station feeds back a beam index, a beam group index, or a beam subset index without the RSRP or the CQI.

In this case, the terminal may perform feedback of Cri-cpi, Cri-cgi-cpi, or Cri-cgi.

Using transmit panel selection (TPS), a receiver may transmit, to the transmitter, feedback about the number or configuration of available panels (antenna panels or antennas) through sensing. Sometimes, a mobile receiver (e.g., a terminal) may not receive signals through some panels due to the location of a surrounding object or a user's hand or body. When the base station recognizes such an event using the feedback between the transmitter and the receiver, there may be a time delay between the occurrence of the event and the recognition there by the base station. However, the terminal may identify that some of the panels are temporarily incapable of communication through sensing.

For example, the terminal may receive a reflection wave of a signal transmitted by the terminal through sensing in sensing mode 2, and, if the distance to the surrounding reflector is very short, may determine that the panel that has transmitted the signal is in a state in which it is incapable of communication. For example, when the terminal has four panels through which sensing is performed in mode 2 and two panels thereof are not available, the terminal may select, as a PMI, an appropriate index of the codebook according to rank 1 or 2, among a preconfigured codebook of rank 4 shared with the base station, and may transmit, to the base station, feedback for selecting two antenna port indexes of the RS to be used.

A transmit panel format (TPF) is a feedback component for indicating that the antenna structure of the terminal changes due to a folding terminal. The folding terminal (or a foldable terminal) is a terminal including a display that can be folded. The device may be divided into two parts (or folding surfaces) and is folded once while the display is attached to the inner sides of the folded parts. Respective antenna panels may be provided in the two parts.

Figure 2:
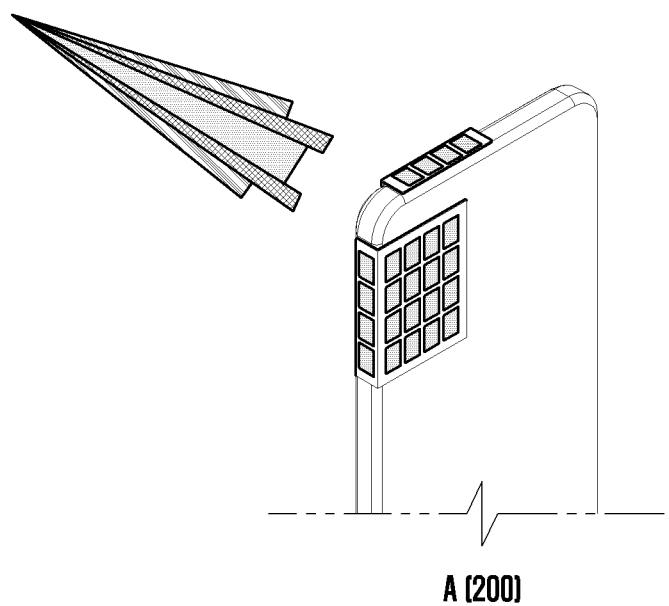
FIG. 2 illustrates a change in an antenna panel according to whether or not a folding terminal is folded according to an embodiment.
Figure 2:
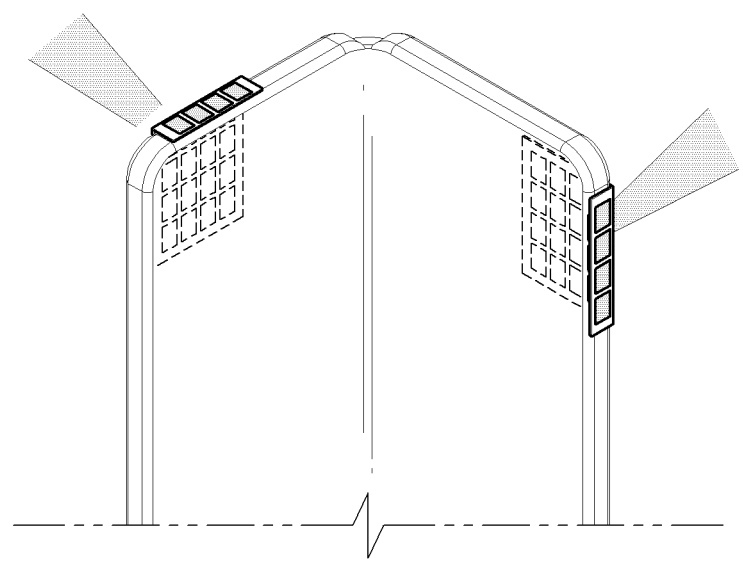

FIG. 2 illustrates a change in an antenna panel according to whether or not a folding terminal is folded according to an embodiment.

Referring to FIG. 2, the antenna panels provided in the respective folding surfaces of the terminal overlap each other in a folded state (A, 200) to appear as a co-located X-pol antenna. Since the antenna panels provided in the respective folding surfaces of the terminal are separated from each other in an unfolded state (B, 210), the antenna panels appear to be spaced a considerable distance apart from each other. When the antenna structure changes according to the folded state and the unfolded state as described above, the correlation between the channels of the antennas is reduced in the channel matrix "H" obtained by combining the channels between the antennas. Therefore, in order to prevent discontinuity of information between the channels, an indicator indicating whether or not the folding terminal is folded is required. An example of the TPF being indicated by 1 bit may correspond to Table 2 below and an example of the TPF being indicated by 2 bits may correspond to Table 3.

TABLE 2

| 1 TPF bit | | |
|---|---|---|
| TPF | Panel mode | Description |
| 0 | X-pol co-located | Folded state |
| 1 | Dipole non co-located | Unfolded state |

Table 2 relates to a folding terminal, and is intended for a device configured such that a single antenna panel is provided in each folding surface and respective antenna panels support different polarizations in a folded state. Therefore, the base station may recognize the antenna of the terminal as a contour of a co-located X-pol antenna in the folded state indicated by TPF "0", and may recognize the same as a contour of two different antennas, which are spaced a considerable distance apart from each other, in the unfolded state indicated by TPF "1". Therefore, the base station may selectively use the most appropriate beam according to the TPF of the terminal. In general, a method in which a single base station transmits a signal to the X-pol antenna in the same beam direction using rank 2 may be used in the case of TPF "0", and a method in which one or more base stations simultaneously transmit and receive signals using a beam of rank 1 or an antenna selection method in which only one of the two antennas is used for transmission and reception of signals may be used in the case of TPF "1".

TABLE 3

| 2 TPF bits | | |
|---|---|---|
| TPF | Panel mode | Description |
| 00 | X-pol co-located | Folded |
| 01 | Dipole non co-located | Unfolded with more than 10λ |
| 10 | Single-pol co-located | Folded |
| 11 | X-pol non co-located | Unfolded with less than 2λ |

Table 3 relates to a folding terminal and is intended for a device configured such that a single antenna panel is provided in each folding surface and respective antenna panels support antenna reconfiguration (i.e., the distance between the panels and the number of active antenna panels change) and a change in the polarizations in a folded state, TPF "00" indicates the state in which one antenna panel has a polarization of +45 degrees to +90 degrees in a folded state and in this case, a single beam of which the maximum rank is 2 with respect to a single base station (i.e., the same beam direction) may be used in the transmission and reception of signals.

TPF "01" indicates the state in which the terminal in an unfolded state has antenna panels in the same polarization, which are spaced a distance of at least 10λ (λ corresponds to the wavelength) apart from each other. In this case, signals may be simultaneously transmitted to and received from two base stations using a beam of rank 1, or only one of the two antennas may be used to transmit and receive signals.

TPF "10" indicates the state in which a folded terminal has two antenna panels overlapping each other in the same polarization. In this case, the transmission and reception of signals may be performed using a single beam of rank 1.

TPF "11" indicates an unfolded state of the terminal in which the distances between several antenna panels are 2 λ or less. In this case, it is possible to transmit and receive signals using a single beam of rank 2.

In addition, when the TPS and/or the TPF are included in channel feedback information to then be fed back to the base station by the terminal, the base station may identify components of the channel feedback information, based on the TPS or the TPF. For example, for a TPF of 2 bits and a TPF value "10", a codebook including one or more precoders (e.g., a precoding matrix) to produce a single beam of rank 1 may be assumed between the base station and the terminal, the PMI included in the channel feedback information may be understood as indicating an index of the precoder of the codebook, and the CQI included in the channel feedback information may be understood as indicating the channel capacity in the case of transmission to which the indicated channel matrix is applied. The base station and the terminal may perform the transmission and reception of data, based on the number of available ranks and beams identified through the TPS and/or the TPF. For example, the base station may transmit data by applying the precoder in the codebook identified through the TPS and/or the TPF, but the disclosure is not limited thereto.

A rank mode is an indicator indicating the application of a plane mode or a spiral mode. The rank mode may be indicated between a transmitter and a receiver and relates to feedback for the receiver to select or change its own rank mode while accessing the transmitter. The rank mode represents a channel mode constituting the rank and includes a plane mode and a spiral mode. The plane mode denotes a mode of using a rank produced when a transmitter and a receiver transmit a plane wave. The plane wave may be produced through a uniform array antenna, and the plane mode denotes a method in which antenna elements including arrays transmit a signal having a phase difference and a random directivity in a specific direction in three-dimensional orthogonal coordinates. It is possible to obtain the maximum number of ranks equal to the number of radio frequencies (RFs) in the antenna, and when there is one RF path, even if there is a plurality of antenna elements, the rank is 1. However, the spiral mode denotes a mode of using a rank produced when a transmitter and a receiver transmit a spiral wave. The spiral wave may be produced through a circular array antenna. Arrays disposed in a circle transmit signals in phase rotation with a specific time difference, the rank may be obtained through a phase difference of the respective three-dimensional coordinates, and the rank is produced through an RF path and a separable phase difference, regardless of the antenna elements.

The plane mode is generally suitable for an environment having many reflection waves, and the spiral mode is generally suitable for a line-of-sight (LOS) environment. If the plane mode is operated in the LOS environment, the rank tends not to increase, regardless of the RF path. Therefore, it is recommended to switch the rank mode to the spiral mode in the LOS environment in order to increase the channel capacity. In addition, since the capability to analyze the phase difference of the receiver is reduced as the distance between the transmitter and the receiver increases in the spiral mode, the transmission distance decreases, compared to the plane mode. However, since the reception power of a signal is strong in a LOS channel, the spiral mode may be preferable.

Therefore, a method is provided for transmitting, to a transmitter, 1 bit of feedback for a terminal to switch between the plane mode and the spiral mode according to the channel state or UE capability signaling indicating whether a receiver is able to operate in the plane mode or the spiral mode. In addition, in the transmitter may configure different codebooks according to the rank mode fed back by the receiver, or the transmitter may configure a codebook for the plane mode, a codebook for the spiral mode, or a codebook for mixing and operating two rank modes according to the capability of the receiver, and may transmit signaling indicating the same to the receiver.

A transmitter and a receiver may switch to modes described below, as well as an existing active mode (or a connected mode) and idle mode. The existing active mode indicates a mode for communication between the transmitter and the receiver, and the idle mode indicates a state in which the transmitter has no more data to transmit so that the receiver is not turned off but no longer supports communication. In the idle mode, the receiver switches to an active mode at a specific time in order to check if there is data to receive, and if there is no data to receive, the receiver switches back to the idle mode.

The transmitter and/or the receiver may have the four modes as follows.

1. Active mode (a mode capable of operating all modes): An active mode denotes when a transmitter or a receiver operates both a communication mode and a sensing mode. In the sensing mode, the transmitter and the receiver should recognize that they are in an active mode in order to prevent interference caused by a communication signal introduced in the sensing mode or operate a signal removal circuit when interference with the communication signal occurs. This is due to the fact that if the communication mode is further operated together with the sensing mode, the power of the communication signal is too high, which makes it difficult to detect a signal for sensing.

2. Semi-active mode (a mode of only active sensing): A semi-active mode denotes the state in which a transmitter or a receiver performs only an active sensing mode, without performing a communication mode. In this case, the transmitter and the receiver may perform active sensing or passive sensing without transmission and reception of data. The semi-active mode may be operated according to a time and a period predetermined using upper signaling, or the transmitter or the receiver may enter the semi-active mode by an arbitrary instruction or command.

3. Idle mode (nothing is done): An idle mode indicates the state in which neither communication nor sensing is performed, as in the existing idle mode.

4. Passive mode (or partially idle mode) (a mode in in which capable of receiving signals only): A passive mode indicates a state in which only a receiving circuit operates. The disclosure includes a method in which a receiver or a transmitter transmits signaling to a counterpart for counterpart to recognize whether or not it is in a passive mode.

Although a mode of a receiver for a multi-modal system provided by the disclosure will be described below, this mode may also be applied to the transmitter.

1. Communication mode: A mode in which all of the antenna panels are used for communication.

2. Dual mode: A mode in which some antenna panels are used for communication, and the remaining antenna panels are used for other purposes. The receiver may transmit, to the transmitter, a report on whether or not a reconfigurable or changeable antenna is included and whether or not a multi-modal precoder is able to be configured using UE capability signaling, and the receiver may transmit a reconfigured setting to the transmitter.

3. Idle mode: A mode in which all of the antenna panels are used for purposes other than communications. The idle mode may be used for reporting, to the transmitter, the channel sensed in the blank symbol configured by the transmitter or a measurement result thereof or for recognizing a channel. In addition, the receiver may report UE capability signaling including information on whether or not sensing is possible in the idle mode and in the blank symbol to the transmitter.

Figure 3:
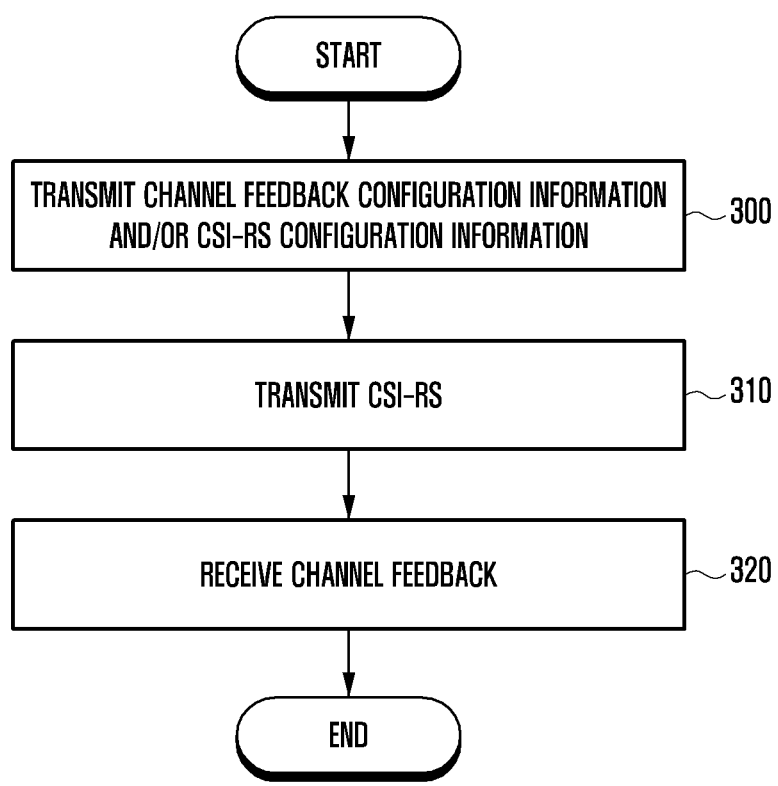
FIG. 3 is a flowchart illustrating a channel feedback method of a transmitter a multi-modal system according to an embodiment.

FIG. 3 is a flowchart illustrating a channel feedback method of a transmitter in a multi-modal system according to an embodiment.

Referring to FIG. 3, a transmitter a base station) may selectively receive UE capability signaling from a receiver (e.g., a terminal). The UE capability signaling may include information indicating whether or not the receiver is able to support at least one of the functions provided by the disclosure, such as whether or not the receiver is able to support a new feedback component, a new mode, etc.

In step 300, the transmitter transmits channel feedback configuration information and/or CSI-RS configuration information to the receiver. The channel feedback configuration information may include at least one of the type of channel feedback information to be fed back by the receiver, time configuration information of channel feedback (periodic channel feedback or aperiodic channel feedback), resources for channel feedback (e.g., a CSI-RS resource to be a target of channel feedback when a plurality of CSI-RS resources are configured), code book information to be applied to channel feedback, etc. The periodic channel feedback may include a period and an offset of feedback.

In addition, the CSI-RS configuration information may include information for configuring a CSI-RS resource, a CSI-RS group, and/or a CSI-RS antenna port, and may further include at least one of time and frequency resource information for each CSI-RS antenna port, CSI-RS sequence information, etc. The transmitter may also transmit SRS configuration information and blank symbol configuration information to the receiver.

In step 310, the transmitter transmits a configured. CSI-RS to the receiver.

In step 320, the transmitter receives channel feedback information transmitted from the receiver.

The channel feedback information may include at least one of CGI and CPI for indicating a beam and RSRP, as well as RI, PMI CQI, and CRI described above, and may also include indicators indicating TPS, TPF, and/or a rank mode. If the channel feedback information includes indicators indicating TPS, TPF, and/or a rank mode, the transmitter may recognize the codebook used by the receiver, based on the indicators indicating TPS, TPF, and/or a rank mode. For example, in the case of a TPF of 1 bit and a TPF value "0" the transmitter may recognize that the receiver has produced channel feedback information on the assumption of a codebook using the same beam direction of the maximum rank 2, may identify the channel fed back by the receiver, based on the codebook, and may perform scheduling for transmission and reception of data, based on the identified channel. In addition, the channel feedback component newly provided in the disclosure may be fed back together with the existing channel feedback information, or may also be fed back separately by the receiver.

Figure 4:
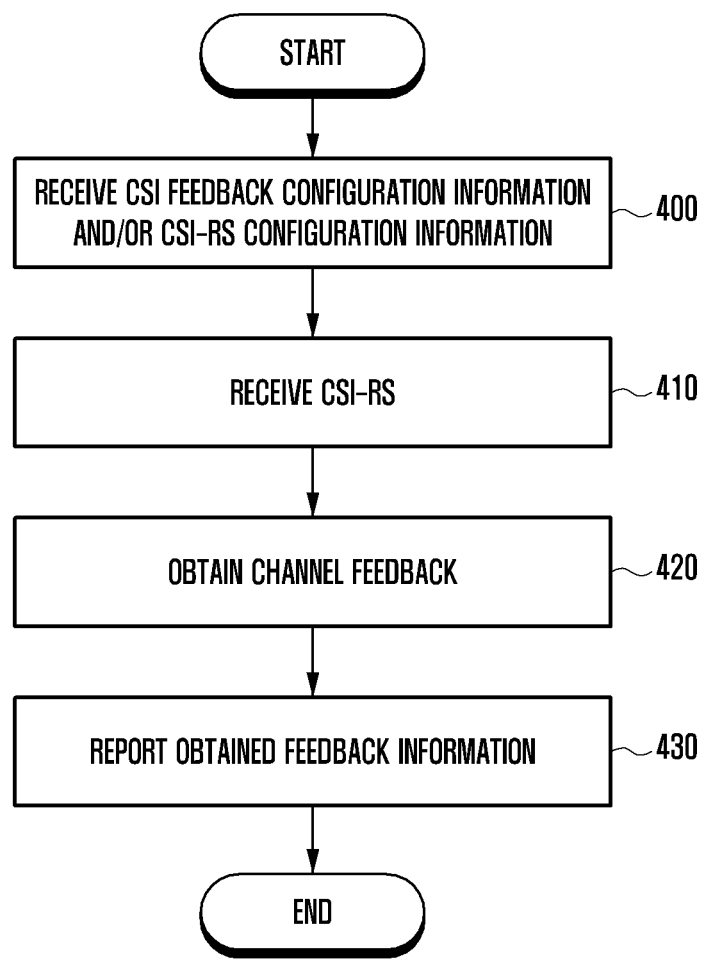
FIG. 4 is a flowchart illustrating a channel feedback method of a receiver in a multi-modal system according to an embodiment.

FIG. 4 is a flowchart illustrating a channel feedback method of a receiver in a multi-modal system according to an embodiment.

Referring to FIG. 4, a receiver (e.g., a terminal) may selectively transmit UE capability signaling to a transmitter (e.g., a base station). The UE capability signaling may include information indicating whether or not the receiver is able to support at least one of the functions provided by the disclosure, such as whether or not the receiver is able to support a new feedback component, a new mode, etc., which are provided by the disclosure.

In step 400, the receiver receives channel feedback configuration information and/or CSI-RS configuration information from the transmitter. The channel feedback configuration information may include at least one of the type of channel feedback information to be fed back by the receiver, time configuration information of channel feedback (periodic channel feedback or aperiodic channel feedback), resources for channel feedback (e.g., a CSI-RS resource to be a target of channel feedback when a plurality of CST-RS resources are configured), code book information to be applied to channel feedback, etc. In addition, the CSI-RS configuration information may include information for configuring a CSI-RS resource, a CSI-RS group, and/or a CSI-RS antenna port, and may further include at least one of time and frequency resource information for each CSI-RS antenna port, CSI-RS sequence information, etc. In addition to the configuration information, the receiver may receive SRS configuration information and blank symbol configuration information from the transmitter.

In step 410, the receiver receives a CSI-RS from the transmitter, based on the CSI-RS information.

In step 420, the receiver obtains channel feedback information, based on the channel feedback configuration information, the CSI-RS reception result, and the sensing result of the receiver.

The channel feedback information may include at least one of CGI and CPI for indicating a beam and RSRP, as well as RI, PMI, CCI, and CRI described above, and may also include indicators indicating TPS, TPF, and/or a rank mode. The receiver may produce the TPS and/or the TPF through the method according to a sensing mode described in the disclosure, through a folded or unfolded state, and/or through sensing whether or not the antenna contour changes. In addition, the receiver may determine a rank mode through the measured channel.

If the channel feedback information includes indicators indicating TPS, TPF, and/or a rank mode as described above, the receiver may determine the codebook used for generating the channel feedback, based on the sensing result and the indicators indicating TPS, TPF, and/or a rank mode. For example, for a TPF of 1 bit and a TPF value "0", the receiver may produce channel feedback information on the assumption of a codebook using the same beam direction of the maximum rank 2.

In step 430, the receiver transmits the obtained channel feedback information to the transmitter, based on the channel feedback configuration information.

Thereafter, the transmitter may perform scheduling for transmission and reception of data, based on the channel determined based on the channel feedback information. In addition, the channel feedback component newly provided in the disclosure may be fed back together with the existing channel feedback information, or may also be fed back separately by the receiver.

Figure 5:
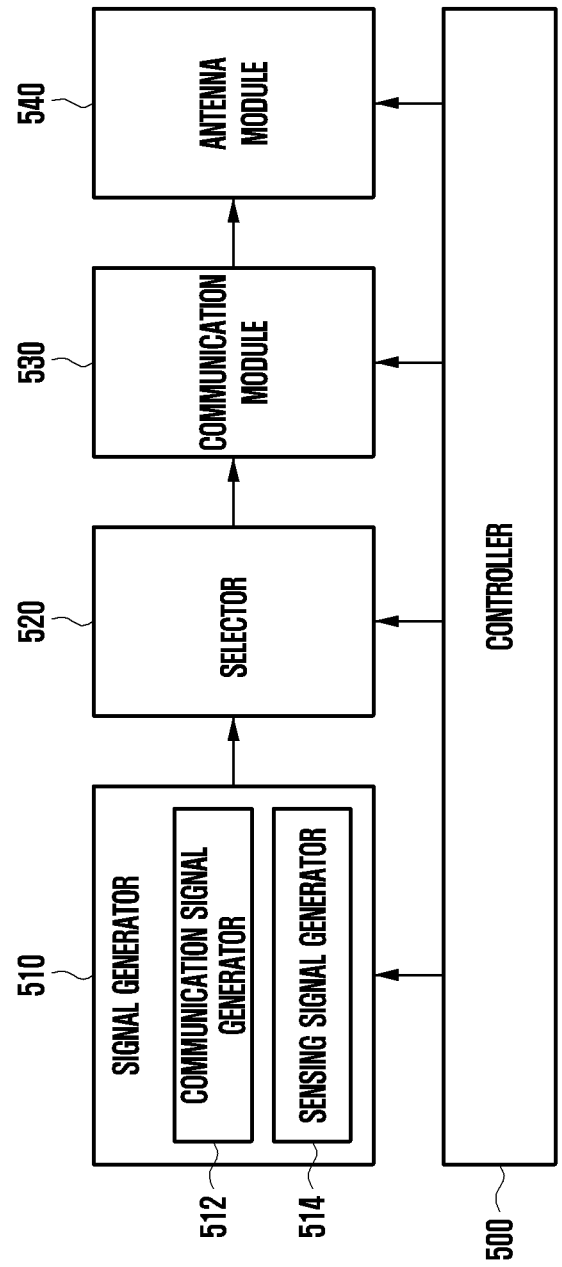
FIG. 5 illustrates modules included in a multi-modal transceiver according to an embodiment.

FIG. 5 illustrates modules included in a multi-modal transceiver according to an embodiment.

Referring to FIG. 5, a multi-modal transceiver includes a signal generator 510 including a communication signal generator 512 and a sensing signal generator 514, a selector 520, a communication module 530, an antenna module 540, and a controller 500, The antenna module 540 may collectively refer to an antenna set and an RF module including one or more antenna elements in a specific pattern or shape. The antenna module may be connected to one or more RF modules. One antenna set may be connected to one RF module, or one or more antenna sets may be connected to one RF module. In addition, one or more RF modules may be connected to one antenna set. In this case, the RF modules may be divided into a module for communication and a module for sensing, and the respective modules may be separated in hardware, or one module may be virtually divided into two different modules in software. The communication module and the sensing module may have independent RE modules or antenna modules and non-independent RF modules or antenna modules. In general, one antenna set may be understood as a set of antenna elements having the same phase shift or path delay applied thereto, and different phase shifts or path delays may be applied between different antenna sets.

The communication module 530 is a device for producing a waveform by modulating a signal produced by the signal generator and transmitting the same in a predetermined frequency band. The communication module may use all of the unlicensed band, the licensed band, and the exclusive radar band in millimeter wave bands, may use the unlicensed band and the licensed band for wireless mobile terminals, and may use all of the unlicensed band, the licensed band, and the exclusive radar band for sensing. The communication module may modulate a signal to be transmitted into one or more waveforms, and the waveforms may include OFDM, SC-FDMA, DFT-s-OFDM, a single carrier (SC), and a continuous wave (CW). In addition, the signal for communication and the waveform for sensing may be the same waveform or different waveforms.

The selector 520 selectively transmits a communication signal and a sensing signal to the communication module 530, and may simultaneously transmit the communication signal and the sensing signal. The signal generator 510 produces a data signal for communication or a signal for sensing. One of the two signals may be used for two purposes, or the two signals may be configured separately. The signal generator 510 includes the communication signal generator 512 and the sensing signal generator 514, or one signal generator may produce a communication signal and a sensing signal. The controller 500 may be a digital signal processor (DSP) that controls the respective modules to produce a desired signal.

Figure 6:
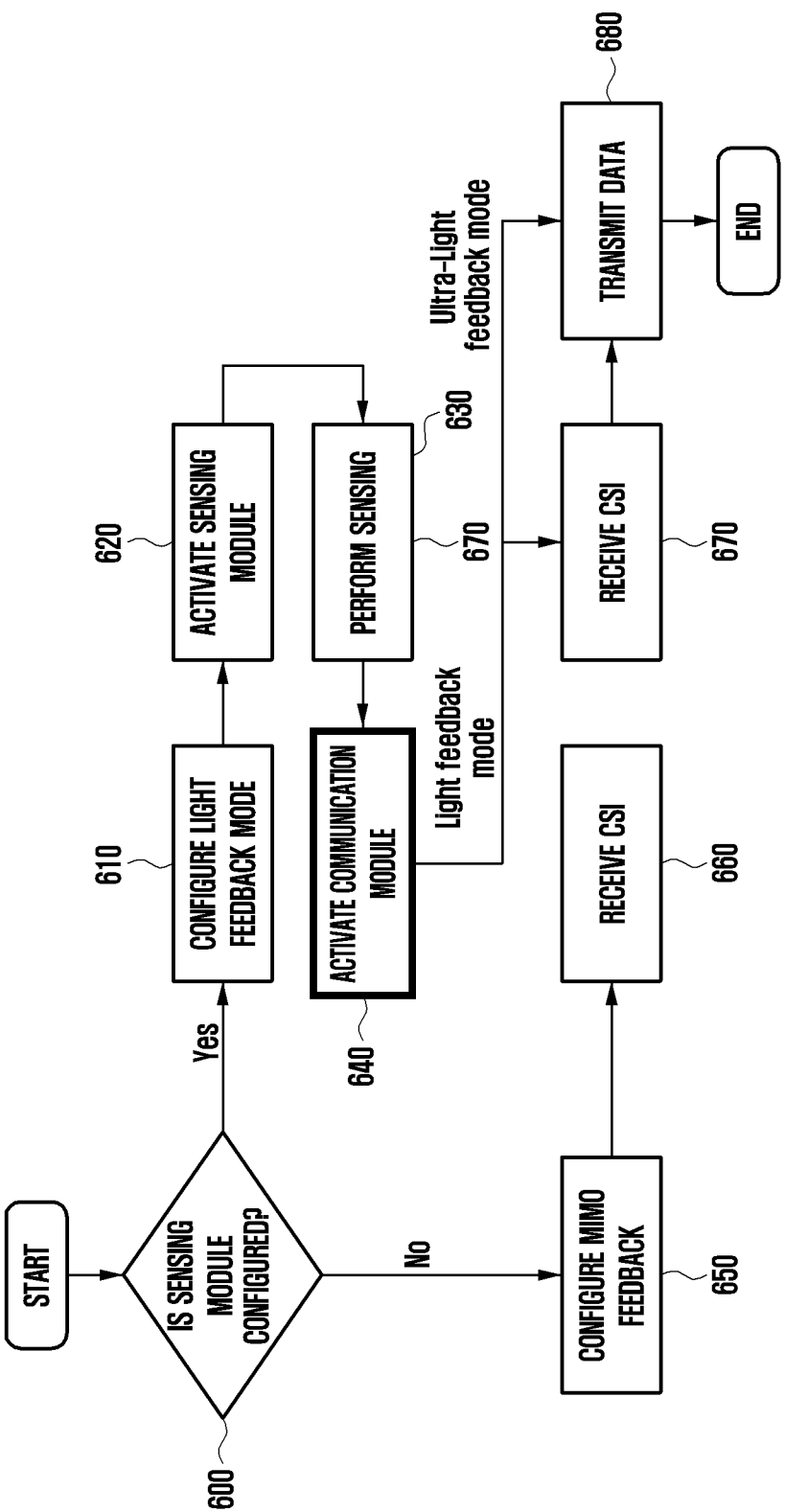
FIG. 6 illustrates a base station that configures a new feedback mode in a terminal according to an embodiment.

FIG. 6 is a flowchart illustrating a base station that configures a new feedback mode in a terminal according to an embodiment.

When the base station has an apparatus for the three sensing functions as described above, the base station may configure a light feedback mode with a very small amount of channel feedback of the terminal. The light feedback mode corresponds to a mode that may provide the same performance of channel estimation as an existing mode using only the above-described beam index and RSRP or CQI feedback. In addition, the base station may configure an ultra-light feedback mode for operating a channel feedback system using only a UL demodulation RS (DMRS) or an SRS, instead of operating the CSI-RS.

Referring to FIG. 6, the base station determines whether or not to configure its own sensing module in step 600.

When the base station has no sensing module (or an apparatus for a sensing module) in step 600, the base station configures a conventional MIMO feedback mode to the terminal in step 650.

In step 660, the base station receives conventional channel feedback information from the terminal.

However, when the base station has a sensing module in step 600, the base station configures a light feedback mode to the terminal in step 610. The light mode feedback may be configured to feed back a beam index and an RSRP or a CQI as described above, or may feedback only a beam index.

In step 620, the base station activates the sensing module, and in step 630, the base station performs sensing. The sensing may include obtaining terminal related information by performing sensing in sensing modes 1, 2, and/or 3 using a sensing module.

In step 640, the base station activates a communication module, based on the sensed information, in order to transmit and receive a signal.

In step 670, the base station receives channel feedback information according to the light feedback mode configured in the terminal through the communication module, and in step 680, performs data scheduling, based on the information obtained through the sensing module and the information obtained from the communication module, thereby transmitting and receiving data. In the ultra-light feedback mode, the base station identifies a channel and performs data scheduling only by measuring and sensing the UL DMRS and/or the SRS transmitted by a terminal, without receiving the channel feedback information in step 670.

Figure 7:
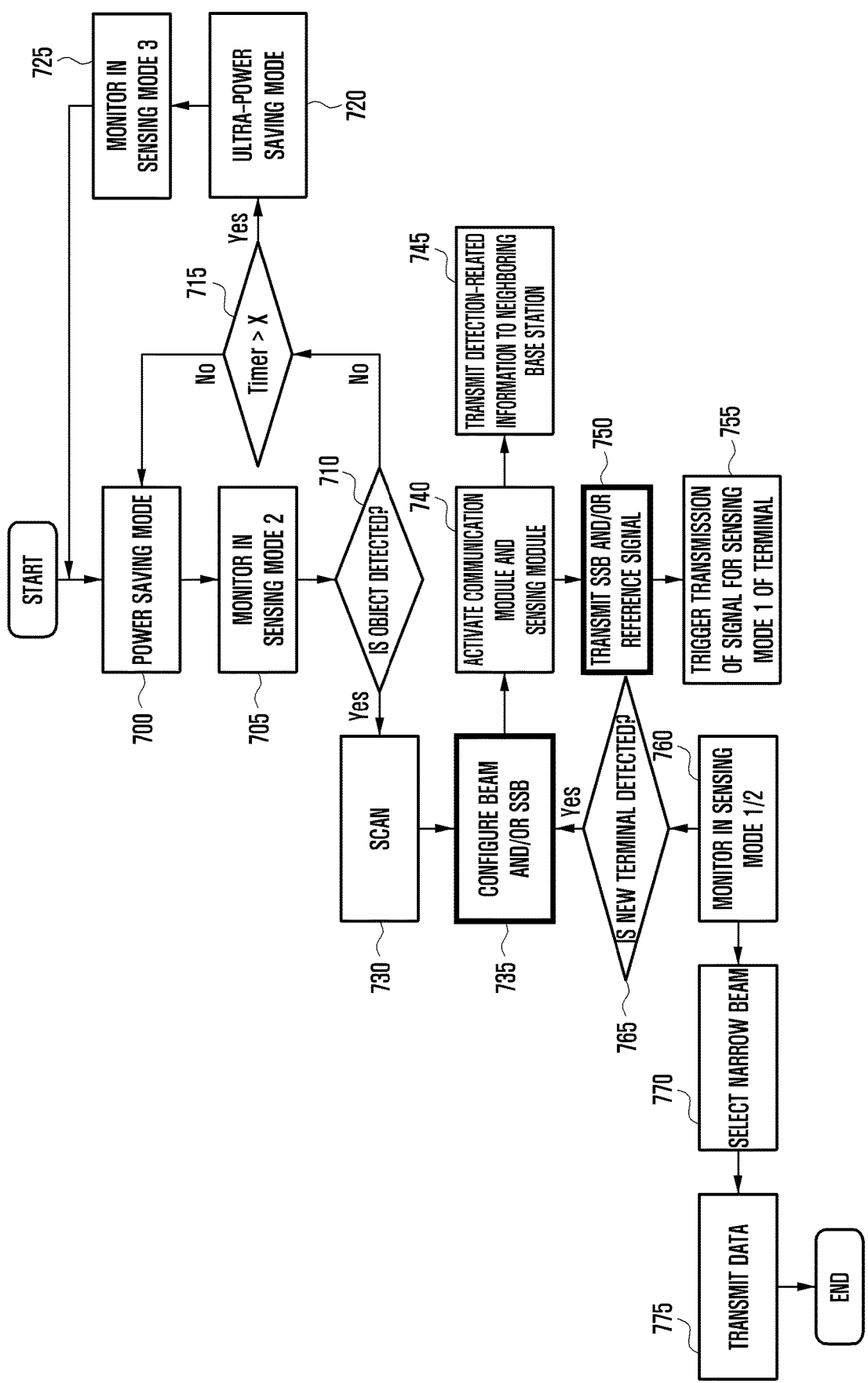
FIG. 7 is a flowchart illustrating a method in which a base station uses a sensing module to reduce overhead of a signal for system operation according to an embodiment.

FIG. 7 is a flowchart illustrating a method in which a base station uses a sensing module to reduce overhead of a signal required for system operation according to an embodiment.

The base station may identify objects present around the base station using sensing information, and may not transmit a signal to an area in which objects are not present or in which a communication function is not available. In addition, the base station may disable a communication module when there is no object to be sensed or when communication is not being performed, thereby preventing unnecessary power consumption for waiting.

Referring to FIG. 7, the base station activates a device for sensing in a power saving mode in step 700. In step 705, the base station performs sensing with respect to a surrounding space in sensing mode 2. The base station determines whether or not an object is detected in step 710, and if there is a detected object, the base station scans the direction in step 730 and makes configuration to add a set of available beams using an RS corresponding to the direction of the object or transmit a set of synchronization signal blocks (SSBs) applying a beam corresponding to the direction of the object in step 735. The scanning may include checking whether or not an object exists in the direction using the sensing mode described above through the sensing module.

In step 740, the base station activates a communication module (and a sensing mode or a sensing module), and in step 745, transmits detection-related information to a neighboring base station.

In steps 750 and 755, the base station transmit an SSB and/or an RS in the direction in which the object is detected, thereby instructing the terminal to transmit a signal for sensing in sensing mode 1.

The base station obtains information through sensing in sensing modes 1 and 2 in step 760, may more accurately measure the beam of the terminal, based on the information obtained through sensing modes 1 and 2, and selects a narrow beam in step 770, thereby efficiently transmitting data in step 775.

If no object is detected in step 710, the base station starts a timer for a predetermined time. The base station determines whether or not the time of the timer is less than a reference value in step 715, and if the time of the timer is less than the reference time, the base station maintains the power saving mode in step 700.

If the time of the timer exceeds the reference time, the base station switches to an ultra-power saving mode in step 720 and performs sensing in sensing mode 3 in step 725, instead of performing the radar function.

The base station determines whether or not a new terminal is found through the sensing m sensing modes 1 and 2 in step 765. If a new terminal is found, the base station makes s configuration to add a set of available beams corresponding to the direction of the terminal or transmit a set of SSBs applying a beam corresponding to the direction of the terminal in step 735.

Figure 8:
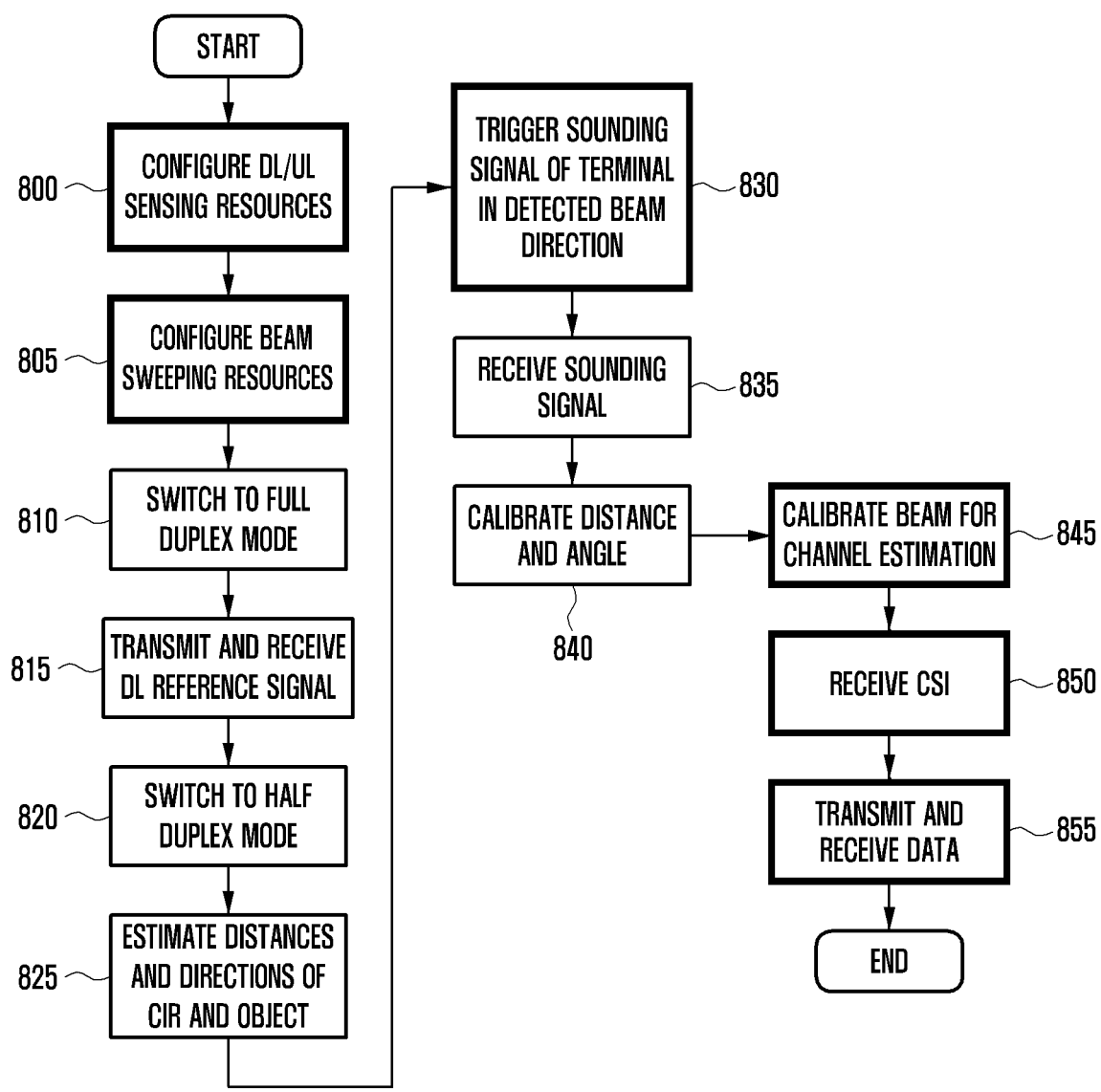
FIG. 8 is a flowchart illustrating a method in which a base station independently identifies a location of a peripheral terminal in a space using a sensing module according to an embodiment.

FIG. 8 is a flowchart illustrating a method in which a single base station independently identifies a location of a peripheral terminal in a space using a sensing module according to an embodiment.

A base station may identify the location of a terminal using a distance to the base station, an angle on the horizontal axis, and an angle on the vertical axis, which are identified through sensed information, and, based on this, may reduce the overhead of a signal required for the operation of a system and reduce the amount of power consumed to transmit signals through the recognition of the location of the terminal.

Referring to FIG. 8, the base station configures time-frequency resources of a DL and a UL for sensing in step 800.

In step 805, the base station configures resources to perform beam sweeping (e.g., different beams are alternately transmitted in different time and/or frequency resources) in the configured DL resources. The beam sweeping may be configured in a narrow bandwidth.

In step 810, the base station switches the base station transceiver to a full duplex mode at the same time as performing steps 805.

In step 815, the base station transmits a DL RS by applying a predetermined beam thereto and simultaneously receives a signal.

The base station switches to a half-duplex mode after transmitting the RS in step 820, and estimates a channel impulse response (CIR), based on the signal received in step 815, thereby estimating distances and directions of the objects, based on the received beam in step 825. This estimation may be a rough estimation that may contain some errors.

In step 830, the base station instructs the terminal to transmit a signal for detecting a channel state a sounding signal, e.g., an SRS or a UL RS) in the detected beam direction using a wider frequency band than the frequency band used in the transmission of the DL RS.

In step 835, the base station receives the SRS from the terminal, and in step 840, estimates the distance and angle of the terminal, based on the received sounding signal. This estimation may be used to calibrate the distance and angle of the terminal, which are estimated in step 825.

In step 845, the base station more accurately calibrates the beam for channel estimation, based on at least one of the received DL and UL channel information and the estimated distance and angle of the terminal. Thereafter, the base station may selectively apply the calibrated beam when transmitting an RS and/or an SSB for channel measurement. The terminal estimates a channel through the CSI-RS transmitted by the base station and reports channel feedback information to the base station, and the base station receives the channel feedback information transmitted by the terminal. In step 855, the base station schedules and transmits/receives data in consideration of the determined location and channel of the terminal.

Figure 9:
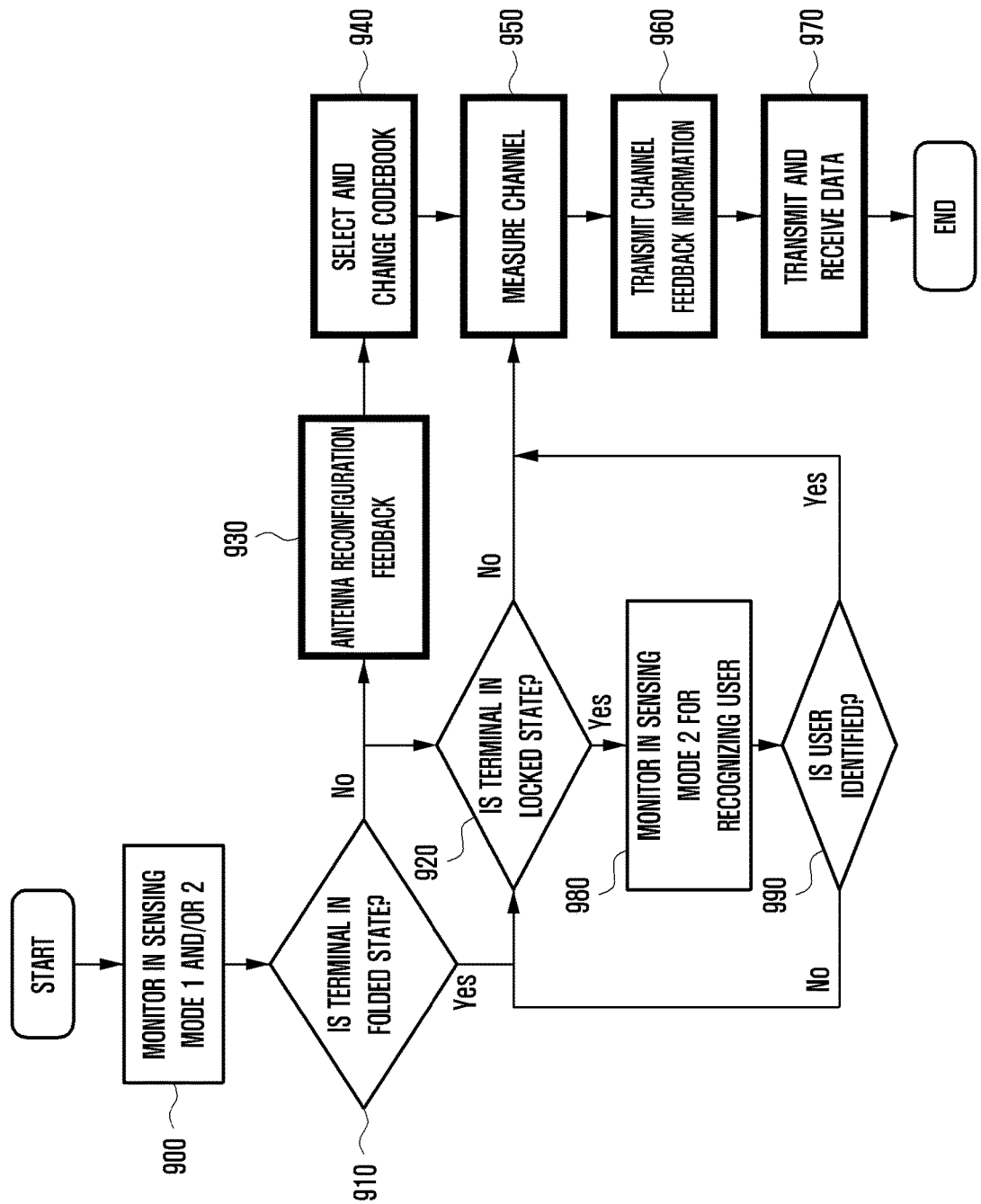
FIG. 9 is a flowchart illustrating a method for feeding back a channel and scheduling data in consideration of a folded state of a terminal according to an embodiment.

FIG. 9 is a flowchart illustrating a method for feeding back a channel and scheduling data in consideration of a folded state of a terminal according to an embodiment.

Referring to FIG. 9, the terminal transmits a signal for sensing using an antenna module in step 900. This signal may be intended for sensing mode 1 or 2.

In step 910, the terminal determines whether it is in a folded (or closed) state or an unfolded (or open) state in consideration of the distance between antenna modules of the folding terminal, based on the received signal.

If the terminal is in an open state, the terminal determines whether or not the terminal is in a locked state in step 920. If the terminal is in the clocked state, the terminal performs sensing a user according to sensing mode 2 in step 980, e.g., sensing a user's face.

In step 990, the terminal determines whether or not the user is an authorized or preregistered user by determining whether or not the received signal conforms to pre-stored sensing information. If the received signal matches a stored signal, the terminal transmits and receives data to and from the base station in step 970.

If it is determined that the terminal is in the open state in step 910, the terminal recognizes that its own state has switched from the closed state to the open state and transmits, to the base station, feedback indicating that reconfiguration of the antenna is required in step 930. A method of transmitting the antenna reconfiguration feedback may include indicating the number of antenna panels, indicating that polarization has been changed from the co-pol to the X-pol, and/or indicating that the number of available beams has increased.

In step 940, the codebook applied to the terminal is changed. The method of changing the codebook may include at least one of the terminal predicting a corresponding configuration and downloading and storing the codebook, configuring two kinds of codebooks for the co-pol and the X-pol in advance and selecting one of them according to the state of the terminal, mixing a preconfigured codebook with the codebooks corresponding to the co-pol and the X-pol, thereby configuring a codebook, using a codebook for one antenna panel when the rank is 1 and using a codebook for two antenna panels when the rank is 2, etc. This change is applied to the base station in the same manner.

In step 950, the terminal measures a channel and produces channel feedback information according to the determined codebook. In step 960, and the terminal feeds the information back to the base station. In step 970, the base station schedules and transmits data, based on the received channel feedback information, to the terminal.

Figure 10:
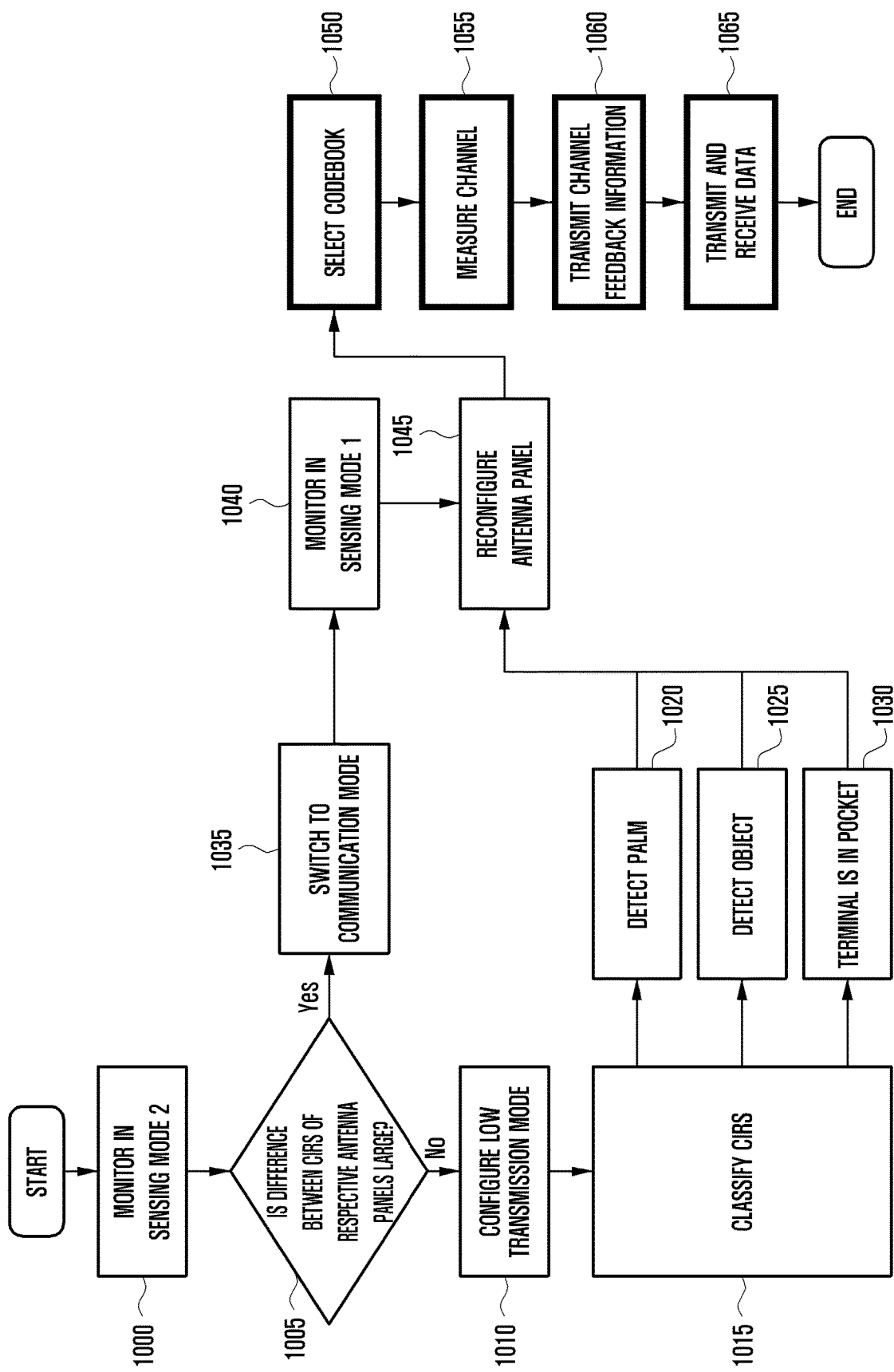
FIG. 10 is a flowchart illustrating a method in which a terminal dynamically detects a user body or a peripheral object and transmits channel feedback information according to an embodiment.

FIG. 10 is a flowchart illustrating a method in which a terminal dynamically detects a user body or a peripheral object and transmits channel feedback information according to an embodiment.

Referring to FIG. 10, the terminal configures a mode for sensing using an antenna module and transmits a signal in step 1000. The sensing may be performed in sensing mode 2.

In step 1005, the terminal determines whether or not the difference between the CIRs received by respective antenna modules (or respective antenna panels) is large, e.g., greater than a predetermined threshold. In order to recognize the difference between the CIRs, the terminal stores an average CIR in each antenna module or panel, and compares the received CIR with the average CIR for the determination. For example, the terminal may store a CIR in the state in which there is nothing around the terminal, and may recognize the difference of the measured CIR, based on the same.

In order to determine the state of each antenna module, the terminal switches to a low transmission (TX) mode (e.g., a mode of transmitting a signal at low power for sensing) for a very short tap delay of the CIR in step 1010 and switches to a communication mode for a relatively long tap delay of the CIR, thereby activating the communication module in step 1035. A long tap delay indicates that a peripheral object is far away, and a short tap delay indicates that a peripheral object is nearby. The tap delay may be determined based on the time of sampling of a reception signal.

In step 1040 the panel that has switched to the communication mode in step 1035 performs sensing in sensing mode 1. Based on the sensing result, the terminal feeds back the number of panels currently available to the base station and reconfigures the antenna panel for UL transmission in step 1045.

An antenna panel configured in a low transmission mode classifies the received CIR, based on existing pre-stored information. For example, the terminal determines whether or not a user's palm is detected in step 1020, whether or not the terminal is in a pocket in step 1030, or whether or not the tap delay detected in the antenna panel is short due to an object, such as a desk, e.g., when the terminal is placed on a desk, in step 1025 based on the received CIR.

In step 1045, the terminal feeds back the number of antenna panels that are currently available to the base station, based on the determined classification information. Thereafter, as described with reference to FIG. 9, the terminal and the base station determine UL and DL codebooks to be applied based on the feedback information on the number of antenna panels in step 1050, and the terminal receives a channel measurement configuration from the base station and measures a channel in step 1055. In step 1060, the terminal produces and feeds back channel feedback information. In step 1065, the base station and the terminal transmit and receive data, based on the channel feedback information.

Figure 11:
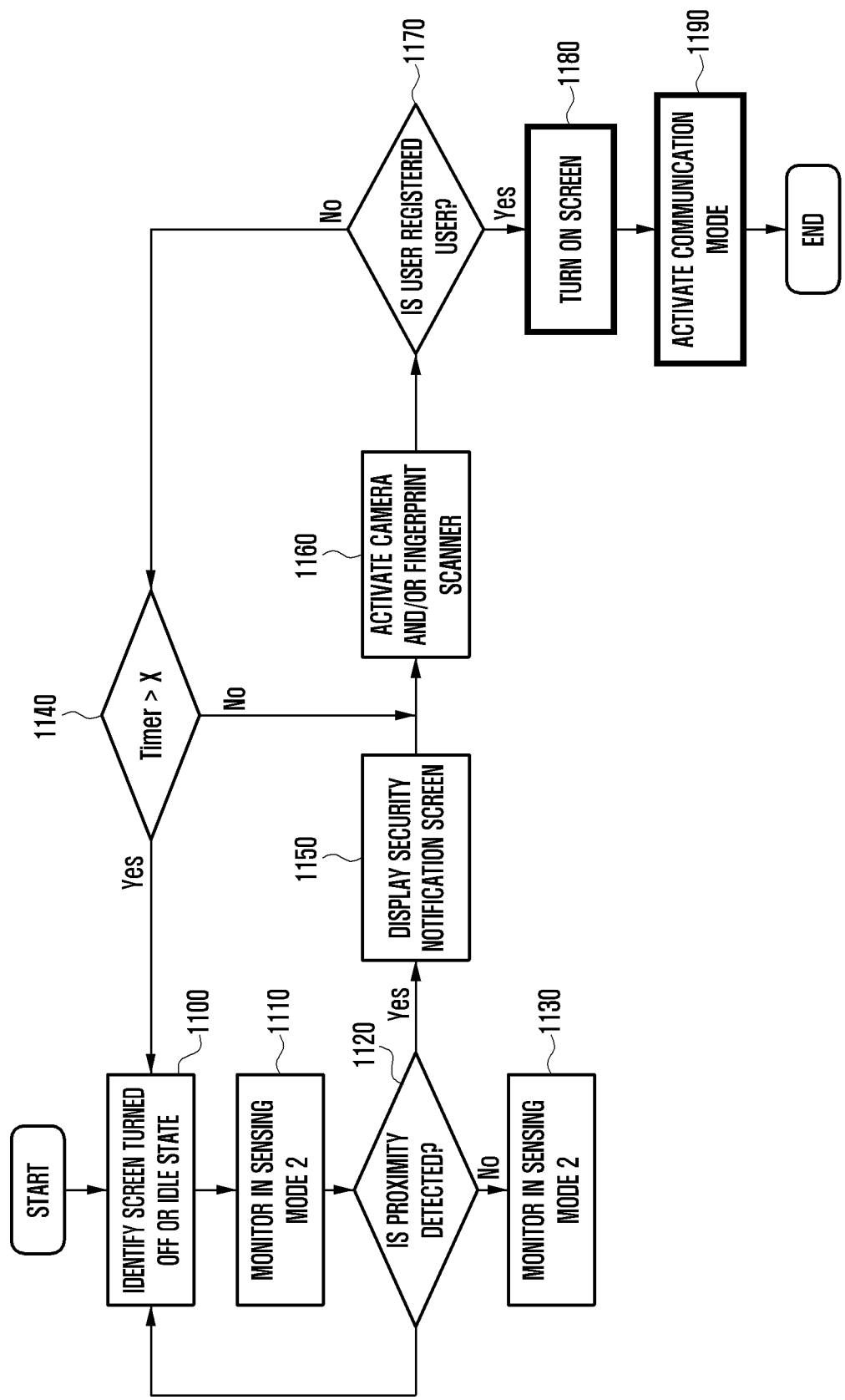
FIG. 11 is a flowchart illustrating a method for detecting a proximity of a user to a terminal and displaying a security notification on a screen according to an embodiment.

FIG. 11 is a flowchart illustrating a method of detecting proximity of a user to a terminal and displaying a security notification on a screen according to an embodiment.

Referring to FIG. 11, the terminal identifies that a screen (or a display) is turned off or is in an idle mode in step 1100. In this case, the terminal performs sensing according to sensing mode 2 in step 1110 and determines whether or not there is an object in proximity to the terminal in step 1120. If there is no object in proximity to the terminal, the terminal continues to perform sensing in sensing mode 2 in step 1130.

However, if there is an object in proximity to the terminal, the terminal displays a security notification on the screen in step 1150 and activates a camera and/or a fingerprint scanner in step 1160. The camera and/or the fingerprint scanner are only examples in step 1160, which may be understood as a step of activating a sensor to identify a user.

In step 1170, the terminal determines whether or not the recognized user is a registered or authorized user, based on the information obtained by the camera, the fingerprint scanner, and/or the sensor for identifying a user. If the recognized user is a registered or authorized user, the terminal turns on the screen in step 1180. Alternatively, the terminal may turn on the screen immediately after displaying the security notification on the screen.

In step 1190, the terminal activates a communication mode to perform communication. If the recognized user is not a registered or authorized user, the terminal operates a timer and determines whether or not the value of the timer is greater than a predetermined reference value in step 1140, If the value of the timer is less than a predetermined reference value, the terminal activates a camera and/or a fingerprint scanner in step 1160, and if the value of the tinier is greater than a predetermined reference value, the terminal turns off the screen and switches to an idle mode when no data is transmitted and received in step 1100.

Figure 12:
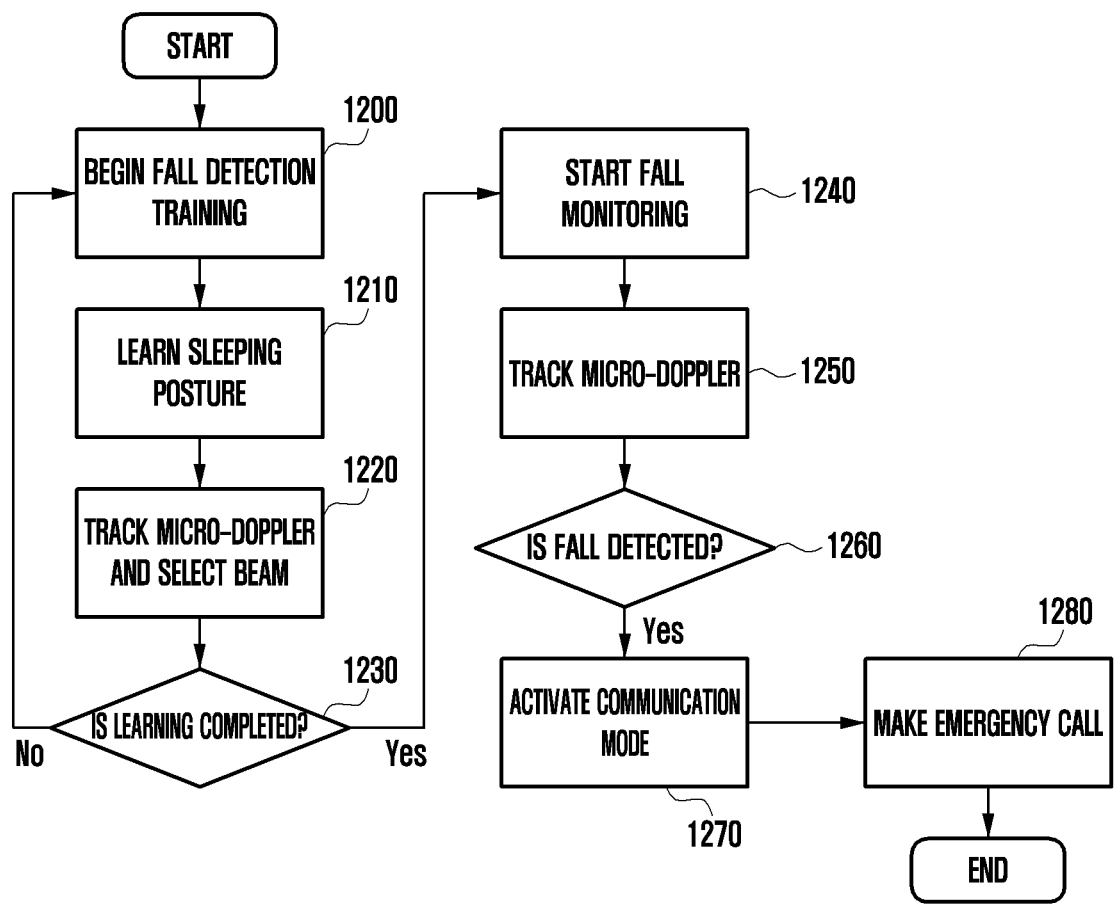
FIG. 12 is a flowchart illustrating a method in which a base station voluntarily provides a service according to a specific application through sensing information, prior to a scheduling request (SR) of a terminal, according to an embodiment.

FIG. 12 is a flowchart illustrating a method in which a base station voluntarily provides a service according to a specific application through sensing information prior to an SR of a terminal according to an embodiment.

In the conventional communication system, when the terminal transmits an SR to the base station, the base station allocates resources for communication to the terminal. However, according to an embodiment of the disclosure, the base station may voluntarily predict the possibility of occurrence of SR through sensing information prior to the SR of the terminal, and may provide a service of a specific application without a request from the terminal. Hereinafter, for example, a method in which a base station detects a fall during sleep and provides an emergency alarm to a service provider will be described.

Referring to FIG. 12, the base station begins training for fall detection in step 1200. In step 1210, the base station learns a sleeping posture of a user through beam tracking. That is, the base station may detect the sleeping posture of the user by measuring beams in respective directions. The base station may track the micro-Doppler, may store the micro-Doppler in the sleep state, and may select a beam in the direction corresponding to the user in step 1220.

In step 1230, the base station determines whether or not the learning is completed. If the learning is not completed, the method returns to step 1200 for the base station to continue the training. However, if the learning is completed in step 1230, the base station starts fall monitoring in step 1240.

The base station performs micro-Doppler tracking in step 1250 and determines whether or not a fall of the user is detected based on the measured micro-Doppler in step 1260. Specifically, the base station may compare the micro-Doppler in a stable state, which is stored in training, with the measured micro-Doppler, and if the amount of change in the micro-Doppler is large, may determine that a fall has been detected. If it is determined that a fall has been detected, the base station makes an emergency call to a service provider using a communication mode in steps 1270 and 1280.

Figure 13:
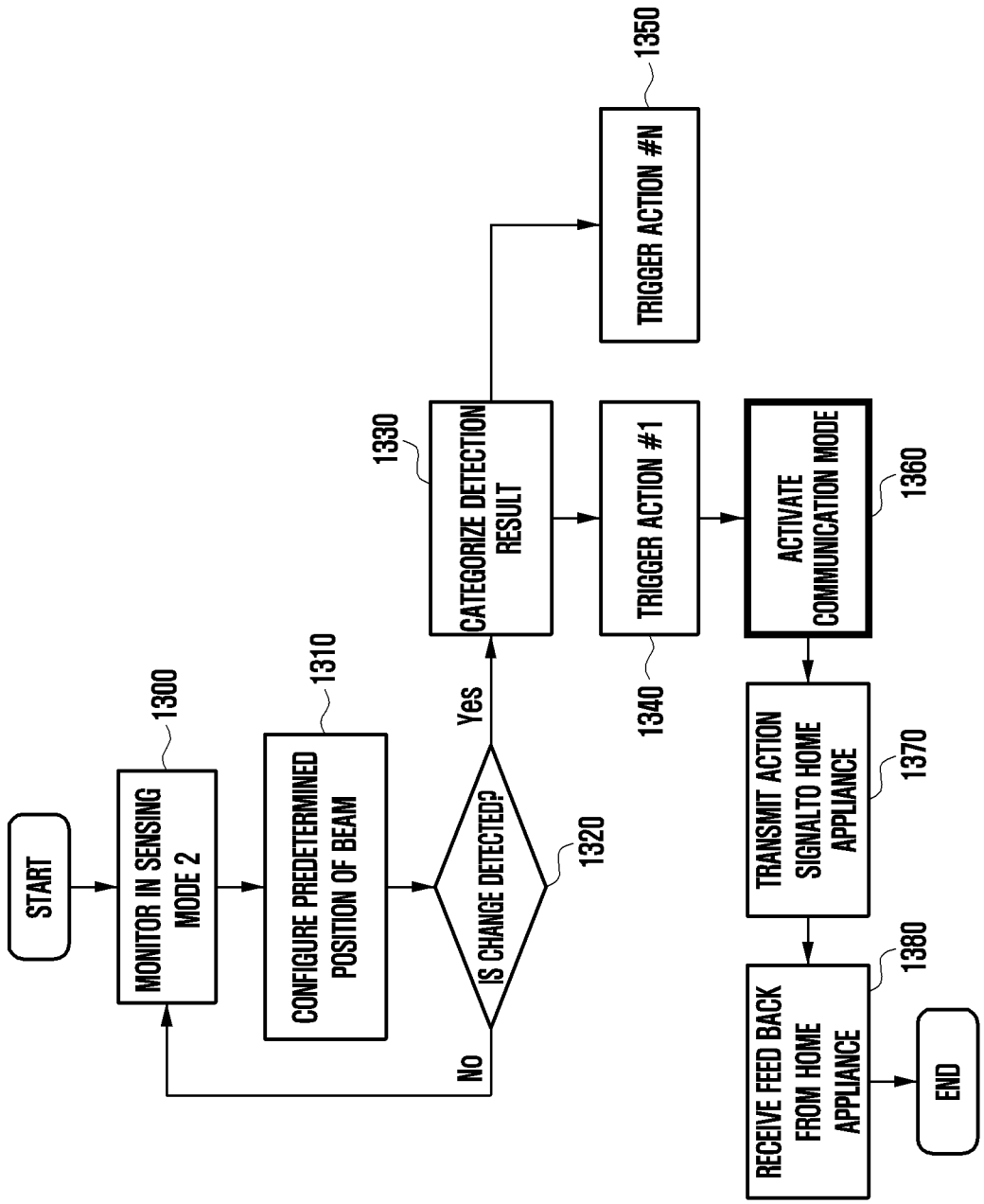
FIG. 13 is a flowchart illustrating a method for transmitting a message, based on a reflected signature, according to an embodiment.

FIG. 13 is a flowchart illustrating a method of transmitting a message, based on a reflected signature, according to an embodiment.

A base station or a sensing hub may map a signature of the micro-Doppler received from a predetermined passive terminal (e.g., a terminal including only reflectors having no transmission function) to a specific message or action one to one, and may store the same.

A method of configuring a signature may include the base station or the sensing hub entering a signature configuration mode. At this time, the base station transmits a sensing signal to the passive terminal and stores sensed information. The base station may perform sensing according to sensing mode 2. The stored signature becomes a default signal. In order to register other signatures, a basic signal is registered, and repetitive operation may then be conducted while passing a hand or other objects between the base station and the passive terminal. For example, an operation of waving a hand, an operation of turning a hand over, etc., may be repeated. In this case, the base station or the sensing hub compares the new sensing result with a registered basic signal, thereby registering a new signature. When the signatures are registered, the respective signatures are mapped to action commands (or action triggers). For example, when the user registers, as signature 1, an operation of waving a hand around the passive terminal to be mapped to an action of turning on a light in the house, the base station recognizes a change in the signature through continuous sensing, and if the change corresponds to signature 1, the base station activates a communications module, thereby transmitting an ON message to the switch of the light.

Referring to FIG. 13, a base station or a sensing hub performs sensing according to sensing mode 2 in step 1300.

In step 1310 and 1320, the base station determines whether or not a result of sensing a change in a predetermined position or beam is detected. If a result of sensing a change is not detected, the base station continues sensing in step 1300. However, if a result of sensing a change is detected, the base station categorizes the detected result of sensing a moving object (i.e., a signature) in step 1330.

In steps 1340 and 1350, the base station determines whether or not the detected signature corresponds to one of the signatures 1 to N pre-stored by the above-described method, and identifies the action mapped to the determined signature. If the detected signature corresponds to a specific signature, the base station activates a communication module to transmit an action or a message mapped to the specific signature to a home appliance in step 1360 and 1370. In step 1380, the base station receives feedback from the home appliance.

Figure 14:
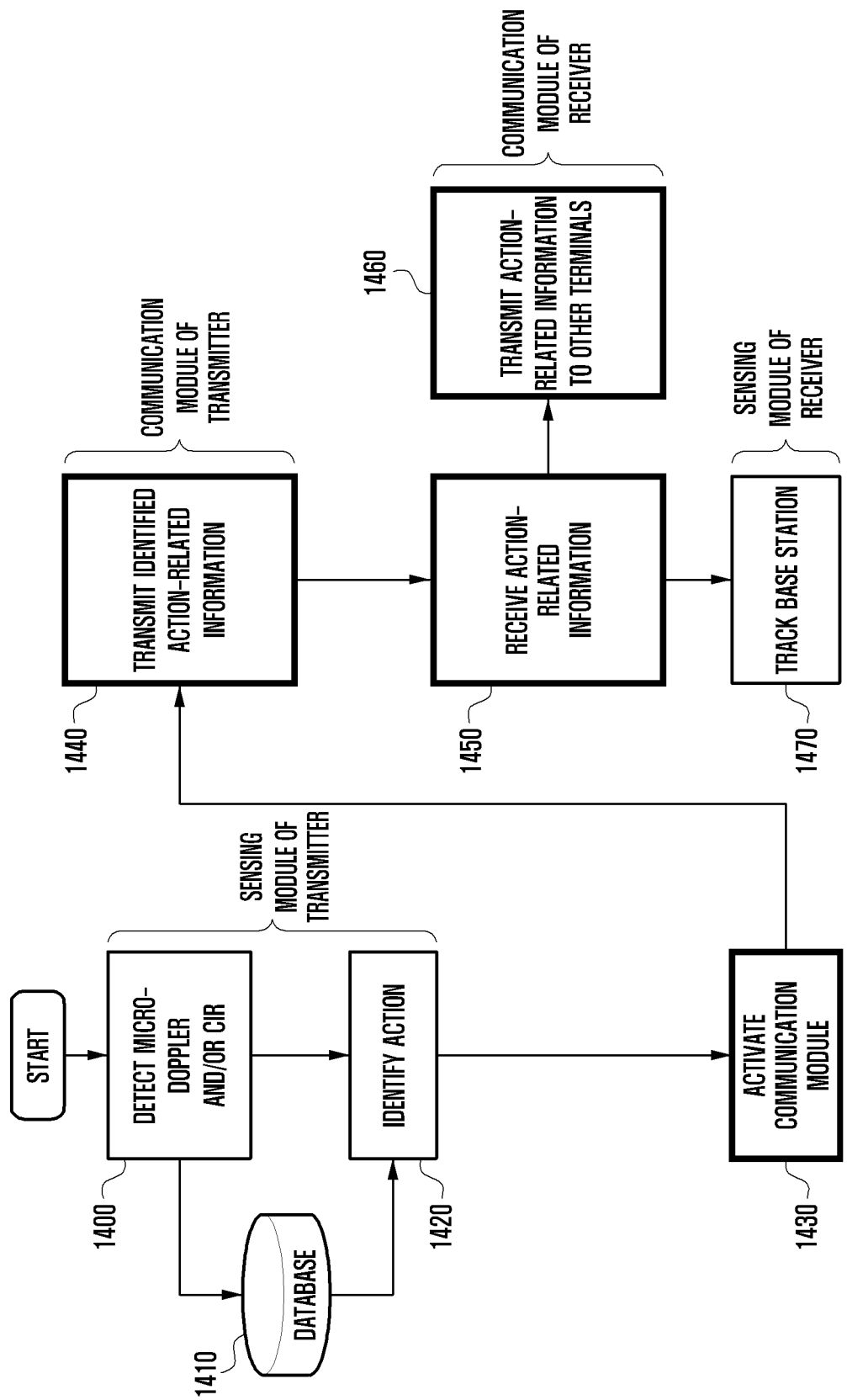
FIG. 14 is a flowchart illustrating a method for recognizing a change in an external environment, based on sensing information, and transferring the same to a vehicle around a base station according to an embodiment.

FIG. 14 is a flowchart illustrating a method of recognizing a change in an external environment, based on sensing information, and transmitting the same to a vehicle around a base station, according to an embodiment.

A transmitter (e.g., a base station, a road side unit (RSL), a terminal, etc.) may classify the micro-Doppler or CIR information, which is estimated based on sensing information, according to a previously classified database to identify a corresponding action (i.e., a detected event, such as congestion of a road, crowding of pedestrians, etc.). If the detected action requires related information, the transmitter may broadcast the detection of the action using a communication module. The transmitter may transmit the corresponding information to a terminal passing through the base station, a vehicle having a terminal function, or a receiver requesting traffic information, and upon receiving the information, the receiver may retransmit the same to other receivers therearound through a broadcast signal.

The transmitter obtains information, based on the sensing module, and classifies the obtained information, based thereon. The transmitter defines an action using a communication module, based on the classified information. The classified information is stored in a database.

Referring to FIG. 14, the base station transmits a signal for sensing using an antenna module and obtains a CIR or a micro-Doppler signature using a sensing signal in step 1400. The acquisition may be performed in a predetermined area or direction. In step 1420, the base station identifies one of the predefined actions using the database 1410, based on the obtained CIR or signature.

If the base station needs a communication mode in order to perform the identified action, the base station switches the communication module to an active state in step 1430. In step 1440, the base station transmits the action-related information to nearby terminals and receivers, based on the identified action, in a broadcast, multicast, or unicast manner.

The terminal senses the base station by switching the sensing module to an active state and the communication module to a semi-active mode, which is an idle state.

When the base station is sensed, the terminal switches the communication module to an active state and receives action-related information in step 1450.

In step 1460, the terminal transmits the received action-related information to other nearby terminals, e.g., by broadcasting. In step 1470, the terminal selectively continues to track the base station.

Figure 15:
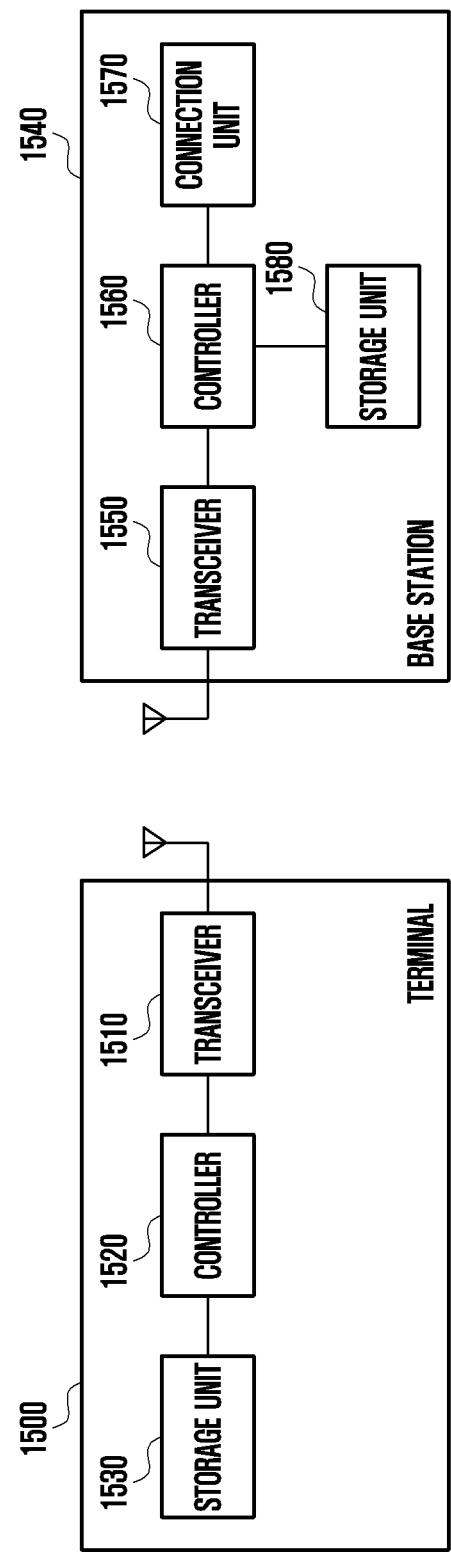
FIG. 15 illustrates a terminal and a base station according to an embodiment.

FIG. 15 illustrates a terminal and a base station apparatus according to an embodiment.

Referring to FIG. 15, a terminal 1500 includes a transceiver 1510, a controller 1520, and a memory (or a storage unit) 1530. However, the components of the terminal 1500 are not limited to the above-described example, and may include more components or fewer components than illustrated in FIG. 15. In addition, the transceiver 1510, the memory 1530, the controller 1520, etc., may be implemented as a single chip.

The transceiver 1510 may transmit and receive a signal to and from a base station 1540. The signal may include control information and data. To this end, the transceiver 1510 may include an RF transmitter for up-converting and amplifying the frequency of a signal to be transmitted, an RF receiver for low-noise-amplifying a received signal and down-converting the frequency thereof, etc. However, this is only an example of the transceiver 1510, and the components of the transceiver 1510 are not limited to the RF transmitter and the RF receiver. In addition, the transceiver 1510 may receive a signal through a wireless channel, thereby outputting the same to the controller 1520, and may transmit a signal output from the controller 1520 through a wireless channel. In addition, the transceiver 1510 may include an RF transceiver for a first wireless communication technique and an RF transceiver for a second wireless communication technique, respectively, or may perform a physical layer processing according to the first wireless communication technique and the second wireless communication technique using a single transceiver. In addition, the transceiver 1510 may perform the sensing described in the disclosure, as well as the communication.

The memory 1530 may store programs and data for the operation of the terminal 1500. In addition, the memory 1530 may store control information or data included in a signal transmitted and received by the terminal 1500. The memory 1530 may be configured as a storage medium, such as a read only memory (ROM), a random access memory (RAM), a hard disk, a compact disc (CD)-ROM, a digital versatile disc (DVD), etc., or a combination thereof. Further, a plurality of memories 1530 may be provided.

The controller 1520 may control a series of processes such that the terminal 1500 may operate according to the above-described embodiment of the disclosure. For example, the controller 1520 may perform control in order to perform the sensing described in the disclosure, based on the sensing configuration information received from the base station 1540 through the transceiver 1510. A plurality of controllers 1520 may be provided, and the controller 1520 may execute a program stored in the memory 1530, thereby performing an operation of controlling the components of the terminal 1500.

In addition, the terminal 1500 may include various sensors for sensing.

The base station 1540 includes a transceiver 1550, a controller 1560, a connector (or a connection unit) 1570, and a memory (or a storage unit) 1580. However, the components of the base station 1540 are not limited to the above-described example, and for example, the base station 1540 may include more components or fewer components than the illustrated components. In addition, the transceiver 1550, the memory 1580, the controller 1560, etc., may be implemented as a single chip.

The transceiver 1550 may transmit and receive a signal to and from the terminal 1500, The signal may include control information and data. To this end, the transceiver 1550 may include an RF transmitter for up-converting and amplifying a frequency of a signal to be transmitted, an RF receiver for low-noise-amplifying a received signal and down-converting the frequency thereof, etc. However, this is only an example of the transceiver 1550, and the components of the transceiver 1550 are not limited to the RF transmitter and the RF receiver. In addition, the transceiver 1550 may receive a signal through a wireless channel, thereby outputting the same to the controller 1560, and may transmit a signal output from the controller 1560 through a wireless channel. In addition, the transceiver 1550 may transmit and receive signals to perform the sensing according to the disclosure.

The controller 1560 may control a series of processes such that the base station 1540 may operate according to the above-described embodiment of the disclosure. For example, the controller 1560 may produce feedback channel configuration information, may transmit the same to the terminal through the transceiver 1550, and may receive channel feedback information. A plurality of controllers 1560 may be provided, and the controller 1560 may execute a program stored in the memory 1580, thereby performing are operation of controlling the components of the base station 1540.

The memory 1580 may store programs and data for the operation of the base station. In addition, the memory 1580 may store control information or data included in a signal transmitted and received by the base station. The memory 1580 may be configured as a storage medium, such as a ROM, a RAM, a hard disk, a CD-ROM, a DVD, etc., or a combination thereof. Further, a plurality of memories 1580 may be provided. For example, the memory 1580 may store the sensing results described in the disclosure.

The connector 1570 may connect the base station 1540, a core network, and other base stations, and may perform a physical layer processing for transmission and reception of a message, thereby transmitting a message to another base station and receiving a message from another base station.

According to the disclosure, as described above, the number of channel state feedback resources of a terminal can be reduced, and the signal transmission power of a base station may be reduced through appropriate scheduling. In addition, it is possible to perform appropriate scheduling for a terminal even if a plurality of sensors are not configured in a base station.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method of operating a base station in a wireless communication system, the method comprising:
   transmitting channel feedback configuration information to a terminal;
   receiving channel feedback information from the terminal; and
   performing at least one of transmission and reception of data, based on the channel feedback information,
   wherein the channel feedback information includes information indicating a state of an antenna panel of the terminal, and
   wherein the information indicating the state of the antenna panel of the terminal includes information indicating a number of available antenna panels and information indicating whether or not the terminal is folded.

2. The method of claim 1, wherein the information indicating the state of the antenna panel of the terminal further includes information indicating a rank mode of the terminal.

3. The method of claim 1, further comprising identifying at least one of a number of ranks or a number of beams for use in transmission and reception of data, based on the information indicating the state of the antenna panel of the terminal.

4. The method of claim 1, further comprising:
   transmitting and receiving a plurality of signals related to different directions, wherein the channel feedback information further includes information indicating at least one of the plurality of signals and a reference signal received power (RSRP) or a channel quality indicator (CQI) related to the at least one signal; and
   identifying a channel state, based on the received signal and the RSRP or the CQI,
   wherein transmission and reception of data is performed based on the channel state.

5. The method of claim 4, wherein the plurality of signals include channel state information reference signals (CSI-RSs), and
   wherein the information indicating at least one signal is information indicating one of one or more CSI-RS resources or one or more CSI-RS antenna ports.

6. The method of claim 1, further comprising:
   receiving a signal in a specific direction for a predetermined time; and
   determining whether or not there is an object in the specific direction, based on noise measured in the specific direction.

7. A method of operating a terminal in a wireless communication system, the method comprising:
   receiving channel feedback configuration information from a base station;
   producing channel feedback information, based on the channel feedback configuration information; and
   transmitting the channel feedback information to the base station,
   wherein the channel feedback information includes information indicating a state of an antenna panel of the terminal, and
   wherein the information indicating the state of the antenna panel of the terminal includes information indicating a number of available antenna panels and information indicating whether or not the terminal is folded.

8. The method of claim 7, wherein the information indicating the state of the antenna panel of the terminal further includes information indicating a rank mode of the terminal.

9. The method of claim 8, further comprising:
   transmitting and receiving a signal through the antenna panel; and
   determining whether or not the antenna panel is available or whether or not the terminal is folded, based on the received signal.

10. The method of claim 7, wherein the information indicating the state of the antenna panel of the terminal is related to at least one of a number of ranks or a number of beams for use in transmission and reception of data.

11. The method of claim 7, further comprising:
receiving a plurality of signals related to different directions; and
producing information indicating at least one of the plurality of signals and a reference signal received power (RSRP) or a channel quality indicator (CQI) related to the at least one signal,
wherein the channel feedback information further includes the information indicating at least one of the plurality of signals and the RSRP or the CQI, which is related to the at least one signal.

12. The method of claim 11, wherein the plurality of signals include channel state information reference signals (CSI-RSs), and
wherein the information indicating at least one signal is information indicating one of one or more CSI-RS resources or one or more CSI-RS antenna ports.

13. A base station in a wireless communication system, the base station comprising:
a transceiver; and
a controller configured to:
transmit channel feedback configuration information to a terminal,
receive channel feedback information from the terminal, and
perform control to transmit and receive data, based on the channel feedback information,
wherein the channel feedback information includes information indicating a state of an antenna panel of the terminal, and
wherein the information indicating the state of the antenna panel of the terminal includes information indicating a number of available antenna panels and information indicating whether or not the terminal is folded.

14. The base station of claim 13, wherein the information indicating the state of the antenna panel of the terminal further includes information indicating a rank mode of the terminal.

15. The base station of claim 13, wherein the controller is further configured to perform control to identify at least one of a number of ranks or a number of beams for use in transmission and reception of data, based on the information indicating the state of the antenna panel of the terminal.

16. The base station of claim 13, wherein the controller is further configured to:
perform control to transmit and receive a plurality of signals related to different directions, wherein the channel feedback information further includes information indicating at least one of the plurality of signals and a reference signal received power (RSRP) or a channel quality indicator (CQI) related to the at least one signal, and
perform control to identify a channel state, based on the received signal and the RSRP or the CQI, and
wherein transmission and reception of data are performed based on the channel state.

17. The base station of claim 16, wherein the plurality of signals include channel state information reference signals (CSI-RSs), and
wherein the information indicating at least one signal is information indicating one of one or more CSI-RS resources or one or more CSI-RS antenna ports.

18. The base station of claim 13, wherein the controller is further configured to perform control to receive a signal in a specific direction for a predetermined time and determine whether or not there is an object in the specific direction, based on noise measured in the specific direction.

19. A terminal in a wireless communication system, the terminal comprising:
a transceiver; and
a controller connected to the transceiver and configured to:
receive channel feedback configuration information from a base station,
produce channel feedback information, based on the channel feedback configuration information, and
perform control to transmit the channel feedback information to the base station,
wherein the channel feedback information includes information indicating a state of an antenna panel of the terminal, and
wherein the information indicating the state of the antenna panel of the terminal includes information indicating a number of available antenna panels and information indicating whether or not the terminal is folded.

20. The terminal of claim 19, wherein the information indicating the state of the antenna panel of the terminal further includes information indicating a rank mode of the terminal.

21. The terminal of claim 20, wherein the controller is further configured to perform control to transmit and receive a signal through the antenna panel and determine whether or not the antenna panel is available or whether or not the terminal is folded, based on the received signal.

22. The terminal of claim 19, wherein the information indicating the state of the antenna panel of the terminal is related to at least one of a number of ranks or a number of beams for use in transmission and reception of data.

23. The terminal of claim 19, wherein the controller is further configured to perform control to receive a plurality of signals related to different directions and produce information indicating at least one of the plurality of signals and a reference signal received power (RSRP) or a channel quality indicator (CQI) related to the at least one signal, and
wherein the channel feedback information further includes the information indicating at least one of the plurality of signals and the RSRP or the CQI, which is related to the at least one signal.

24. The terminal of claim 23, wherein the plurality of signals include channel state information reference signals (CSI-RSs), and
wherein the information indicating at least one signal is information indicating one of one or more CSI-RS resources or one or more CSI-RS antenna ports.

* * * * *